US012223620B2

United States Patent
Gupta et al.

(10) Patent No.: US 12,223,620 B2
(45) Date of Patent: Feb. 11, 2025

(54) SYSTEMS, METHODS, AND MEDIA FOR EULERIAN SINGLE-PHOTON COMPUTER VISION

(71) Applicant: Wisconsin Alumni Research Foundation, Madison, WI (US)

(72) Inventors: Mohit Gupta, Middleton, WI (US); Shantanu Gupta, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 98 days.

(21) Appl. No.: 18/310,399

(22) Filed: May 1, 2023

(65) Prior Publication Data

US 2024/0370974 A1 Nov. 7, 2024

(51) Int. Cl.
*G06T 5/20* (2006.01)
*G06T 5/70* (2024.01)
*G06T 7/13* (2017.01)
*G06T 7/246* (2017.01)
*H04N 25/76* (2023.01)

(52) U.S. Cl.
CPC ............. *G06T 5/20* (2013.01); *G06T 5/70* (2024.01); *G06T 7/13* (2017.01); *G06T 7/248* (2017.01); *H04N 25/76* (2023.01); *G06T 2207/10016* (2013.01)

(58) Field of Classification Search
CPC .... G06T 5/20; G06T 5/70; G06T 7/13; G06T 7/248; G06T 2207/10016; H04N 25/76
See application file for complete search history.

(56) References Cited

U.S. PATENT DOCUMENTS

| | | | |
|---|---|---|---|
| 2022/0358346 A1* | 11/2022 | Gupta | G06N 3/065 |
| 2023/0045152 A1* | 2/2023 | Saliu | G06T 7/70 |
| 2024/0130621 A1* | 4/2024 | Islam | A61B 5/0022 |

OTHER PUBLICATIONS

Chandramouli et al., "A Bit Too Much? High Speed Imaging from Sparse Photon Counts", arXiv:1811.02396v3 [cs.CV] May 11, 2019.
Chi et al., "Dynamic Low-light Imaging with Quanta Image Sensors", (2020).

(Continued)

*Primary Examiner* — Twyler L Haskins
*Assistant Examiner* — Angel L Garces-Rivera
(74) *Attorney, Agent, or Firm* — Quarles & Brady, LLP

(57) ABSTRACT

In accordance with some embodiments, systems, methods, and media for Eulerian single-photon computer vision are provided. In some embodiments, the system comprises: an image sensor comprising detectors configured to detect arrival of individual photons, and arranged in an array; a processor programmed to: cause the image sensor to generate a sequence of images representing a scene, each of the images comprising a plurality of pixels; perform, for each of a plurality of three dimensional filters, a convolution between the three dimensional filter and a plurality of frames, wherein each of the plurality of frames is based on one or more of the images of the sequence of images; generate, for each of the plurality of frames, a plurality of filter bank responses each corresponding to a three dimensional filter of the plurality of three dimensional filters; and perform a computer vision process based on the plurality of filter responses.

21 Claims, 11 Drawing Sheets
(9 of 11 Drawing Sheet(s) Filed in Color)

(56) References Cited

OTHER PUBLICATIONS

Fleet et al. "Computation of component image velocity from local phase information", International Journal of Computer Vision, 5:1, 77-104 (1990).
Kovesi (2003), "Phase Congruency Detects Corners and Edges".
Ma et al., "Quanta Burst Photography", ACM Trans. Graph., vol. 39, No. 4, Article 79. Publication date: Jul. 2020.
Ma et al. (2023), "Burst Vision using Single-Photon Cameras".
Myerscough and Nixon, "Temporal Phase Congruency". (2004) IEEE.
Schug et al. (2017), "Precise State Tracking Using Three-Dimensional Edge Detection".
Wadhwa et al. (2013), "Phase-based video motion processing".
Wu et al. (2012), "Eulerian Video Magnification for Revealing Subtle Changes in the World".

* cited by examiner (a) $v = 0$ (b) $v = 1$ pixel/frame

SYSTEMS, METHODS, AND MEDIA FOR EULERIAN SINGLE-PHOTON COMPUTER VISION

STATEMENT REGARDING FEDERALLY SPONSORED RESEARCH

This invention was made with government support under 1943149 awarded by the National Science Foundation. The government has certain rights in the invention.

CROSS-REFERENCE TO RELATED APPLICATIONS

N/A

BACKGROUND

Conventional digital camera image sensors typically capture hundreds to thousands of photons per pixel to create an image. Recently, single-photon avalanche diodes (SPADs) that can detect individual photons, and precisely measure the time-of-arrival, have become more prevalent. SPADs are driving the development of new devices with novel functionalities due to the sensitivity and picosecond time resolution that can be achieved, such as imaging at very high frame rates (e.g., in excess of a billion frames per second), non-line-of-sight (NLOS) imaging, and microscopic imaging of nano time-scale bio-phenomena.

However, these new SPAD-based imaging techniques are typically active, where the SPAD is used in precise temporal synchronization with an active light source (e.g., a pulsed laser). This includes applications such as NLOS imaging, LiDAR, and microscopy. Due to the output of a SPAD (e.g., a detection of a single photon at a precise time), SPADs are not as well suited to more conventional imaging tasks, such as capturing images of a scene under passive, uncontrolled illumination (e.g., sunlight, moonlight). While passive SPAD-based imaging systems could potentially expand the scope of SPADs to a considerably larger set of applications, including machine vision, data generated from passive SPAD-based data has so far been of relatively low quality compared to images captured using conventional image sensors.

Accordingly, new systems, methods, and media for Eulerian single-photon computer vision are desirable.

SUMMARY

In accordance with some embodiments of the disclosed subject matter, systems, methods, and media for Eulerian single-photon computer vision are provided.

In accordance with some embodiments of the disclosed subject matter, a system for facilitating single-photon computer vision tasks is provided, the system comprising: an image sensor comprising a plurality of detectors configured to detect arrival of individual photons, the plurality of detectors arranged in an array; at least one processor that is programmed to: cause the image sensor to generate a sequence of images representing a scene, each of the images comprising a plurality of pixels; perform, for each of a plurality of three dimensional filters, a convolution between the three dimensional filter and a plurality of frames, wherein each of the plurality of frames is based on one or more of the images of the sequence of images; generate, for each of the plurality of frames, a plurality of filter bank responses each corresponding to a three dimensional filter of the plurality of three dimensional filters; and perform a computer vision process based on the plurality of filter responses.

In some embodiments, each of the plurality of detectors comprises a single photon avalanche diode (SPAD).

In some embodiments, each image of the sequence of images comprises a binary image that represents photons detected by the image sensor during an exposure time i.

In some embodiments, each of the plurality of three dimensional filters comprises a velocity tuned filter, and wherein a first subset of the plurality of three dimensional filters are tuned to a three dimensional frequency $k:=(k_x, k_y, k_t)$, where $k_x$ and $k_y$ represent spatial patterns, and $k_t$ represents a pattern in time, each of the three dimensional filters of the first subset having a different scale.

In some embodiments, the at least one processor that is further programmed to: determine a z-score for each of the plurality of filter bank responses; map each z-score to a weight associated with the respective filter bank for which the z-score was determined; and utilize the weighted filter bank responses to perform the computer vision process based on the plurality of filter responses.

In some embodiments, the at least one processor that is further programmed to: estimate a variance value $Var(R_k[p])$ using a relationship $V_k[p] := V(\hat{c}[p])\Sigma_q |h_k[q]|^2$, where $R_k[p]$ is a filter bank response generated by applying a filter $h_k[q]$ to the plurality of frames $B[p]$, $V(\hat{c}[p])$ is a variance of an estimated local average flux over $B[p]$, and $\Sigma_q |h_k[q]|^2$ is a sum of the filter $h_k[q]$ over $q<p$; and determine the z-score using a relationship $$z_k[p] := \frac{|R_k[p]|}{\sqrt{V_k[p]}}.$$

In some embodiments, the at least one processor that is further programmed to: map each z-score to a weight associated with the respective filter bank for which the z-score was determined using a relationship $w(z) := 1 - \exp(-\max(0, z-z_0))$, where $z_0$ comprises a threshold z-score.

In some embodiments, the computer vision process is an edge detection process, and wherein at least one processor that is further programmed to: perform the computer vision process based on a phase congruency associated with each of the plurality of filter responses.

In some embodiments, at least one processor that is further programmed to: detect one or more corners based on the phase congruency associated with each of the plurality of filter responses.

In some embodiments, the computer vision process is a motion estimation process, and wherein at least one processor that is further programmed to: perform the computer vision process for each of the plurality of pixels based on a phase constancy relationship $v_x \cos \theta + v_y \sin \theta = \cot \phi$, where $(v_x, v_y)$ is a velocity at the respective pixel, $v_n = \cot \phi$ is a component velocity of a respective three dimensional filter $\tilde{k}$ in a spatial direction $\theta$, and $\tilde{k} := \tilde{s} \cdot (\sin \phi \cos \theta, \sin \phi \sin \theta, \cos \phi)$, where $(\theta, \phi)$ is a spatio-temporal direction of $\tilde{k}$.

In accordance with some embodiments of the disclosed subject matter, a method for facilitating single-photon computer vision tasks is provided, the method comprising: causing an image sensor to generate a sequence of images representing a scene, each of the images comprising a plurality of pixels, wherein the image sensor comprises a plurality of detectors configured to detect arrival of individual photons, the plurality of detectors arranged in an array; performing, for each of a plurality of three dimensional filters, a convolution between the three dimensional filter and a plurality of frames, wherein each of the plurality of frames is based on one or more of the images of the sequence of images; generating, for each of the plurality of frames, a plurality of filter bank responses each corresponding to a three dimensional filter of the plurality of three dimensional filters; and performing a computer vision process based on the plurality of filter responses.

In accordance with some embodiments of the disclosed subject matter, a non-transitory computer readable medium containing computer executable instructions that, when executed by a processor, cause the processor to perform a method for facilitating single-photon computer vision tasks is provided, the method comprising: causing an image sensor to generate a sequence of images representing a scene, each of the images comprising a plurality of pixels, wherein the image sensor comprises a plurality of detectors configured to detect arrival of individual photons, the plurality of detectors arranged in an array; performing, for each of a plurality of three dimensional filters, a convolution between the three dimensional filter and a plurality of frames, wherein each of the plurality of frames is based on one or more of the images of the sequence of images; generating, for each of the plurality of frames, a plurality of filter bank responses each corresponding to a three dimensional filter of the plurality of three dimensional filters; and performing a computer vision process based on the plurality of filter responses.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
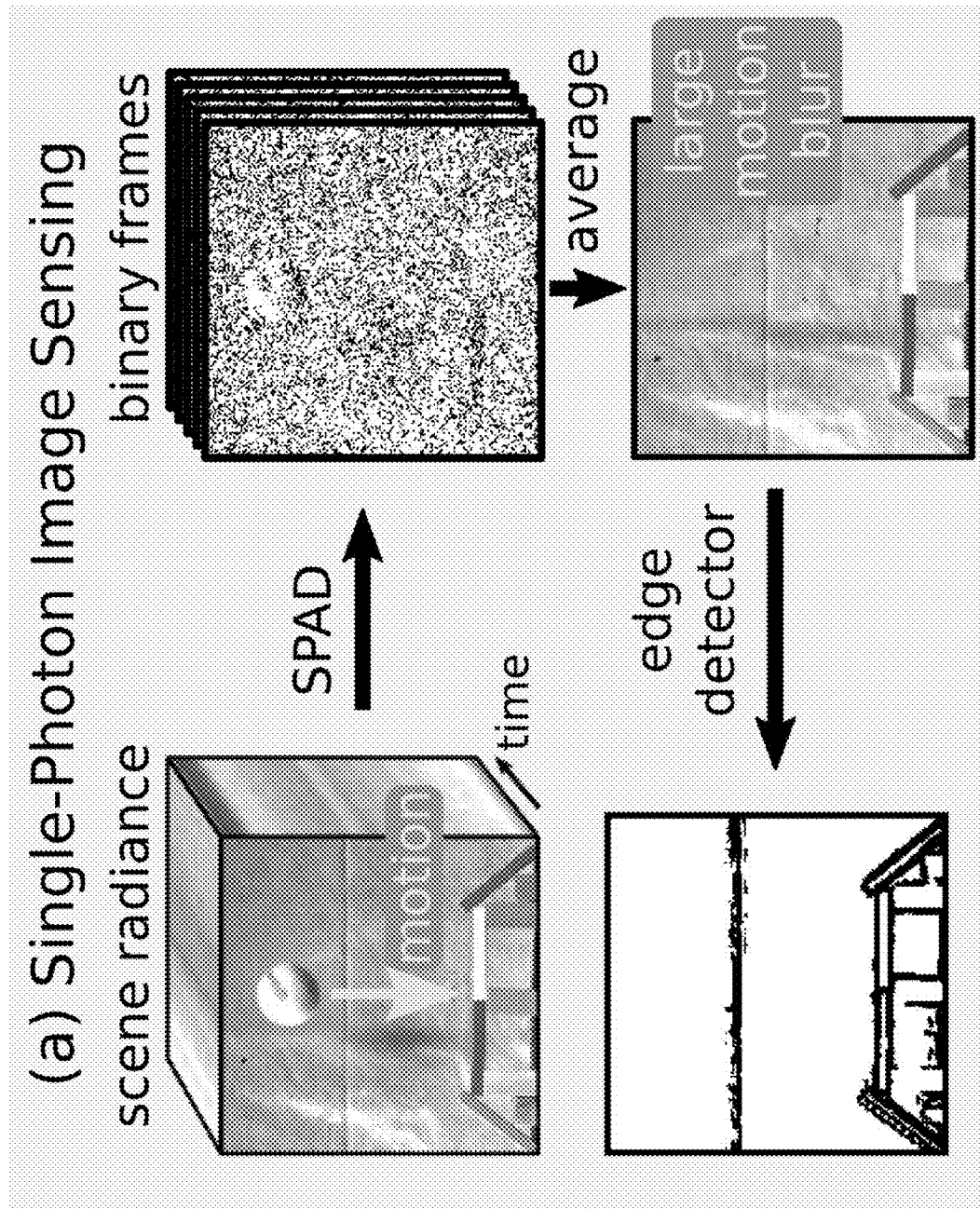
FIG. 1A shows an example of a computer vision result generated from an image of a scene obtained by averaging a series of binary frames.

In accordance with various embodiments, mechanisms (which can, for example, include systems, methods, and media) for Eulerian single-photon vision are provided.

Single-photon sensors, such as SPADs, can measure light signals at the finest possible resolution, individual photons. Such sensors introduce two major challenges in the form of strong Poisson noise and extremely large data acquisition rates, which are also inherited by downstream computer vision tasks. Previous work has largely focused on solving the image reconstruction problem first and then using off-the-shelf techniques for downstream tasks. However, the most general solutions that account for motion are typically computationally costly and not scalable to large data volumes produced by single-photon sensors.

In some embodiments, mechanisms described herein can facilitate performing computer vision tasks using data from a single-photon imager without performing explicit image reconstruction from the data. For example, as described herein, computationally light-weight phase-based techniques for computer vision tasks (e.g., of edge detection and motion estimation) can be used to perform computer vision tasks that directly process raw single-photon data as a 3D volume (e.g., using velocity-tuned filtering), applying 3D convolution kernels to the incoming photon stream. As described below in connection with FIGS. 6-10, experiments that demonstrate results of using techniques described herein on both edge detection and motion estimation tasks were conducted, achieving more than two orders of magnitude speed-ups compared to explicit reconstruction-based techniques.

In general, digital image sensors record light on discrete sensing elements (often referred to as pixels). The spatio-temporal density of these measurements has continually increased over time, and recent developments have results in single-photon quanta sensors, such as single-photon avalanche diodes (SPADs) and jots (e.g., as described in Fossum et al., "The Quanta Image Sensor: Every Photon Counts," Sensors, 16, 1260 (2016)). Such single-photon sensors can be configured to record measurements at the granularity of individual photons, and can be facilitate an exciting array of applications, such as photography in challenging conditions (e.g., low-light, fast-motion, and/or high dynamic range), high-speed tracking, and 3D imaging.

Such single-photon sensors open up new opportunities by providing access to individual photon arrival times. A challenge presented by such sensors is the amount of raw data captured by these sensors (e.g., leading to difficulties moving the data off the image sensor), that such raw data is heavily quantized (e.g., going down to a single bit per pixel), and that such raw data is generally noisy (e.g., due to Poisson statistics of photons). Additionally, computational (and therefore power) costs to analyze such raw data is generally high, as treating individual photons independently instead of aggregating them (like conventional sensors) increases the amount of storage, computational, and communication costs associated with capturing and using such data. These challenges are precluding the large-scale practical adoption of this otherwise exciting technology.

In some embodiments, mechanisms described herein can be used to implement relatively light-weight (e.g., using relatively fewer computing resources, such as memory, processing resources, and communication resources) computer vision techniques for single-photon imagers that capture binary single-photon frames (and/or multi-bit single-photon frames) at relatively high speeds. The most widely studied problem in single-photon imaging has been image reconstruction, under the assumption that recovering a high-quality image from single-photon data is critical for downstream inference. However, strong noise and heavy quantization make reconstructing images from binary frames (particularly from single binary frames) a difficult problem, often needing strong priors and computationally intensive techniques to reconstruct an image. In some embodiments, mechanisms described herein FIG. 1A shows an example of a computer vision result generated from an image of a scene obtained by averaging a series of binary frames.

As shown in FIG. 1A, as radiance in a scene changes over time, a SPAD array (or other suitable single-photon image sensor) can capture a high-speed sequence of binary frames. As shown in FIG. 1A, a single frame is extremely noisy and quantized, and naively averaging frames over time increases the signal, but loses motion information.

An intuitive technique to mitigate the noise and quantization of the data is to aggregate information over many frames. However, this approach is prone to potentially severe motion blur. For example, as shown in FIG. 1A, the falling ball gets completely blurred when binary frames are naively averaged.

Figure 1B:
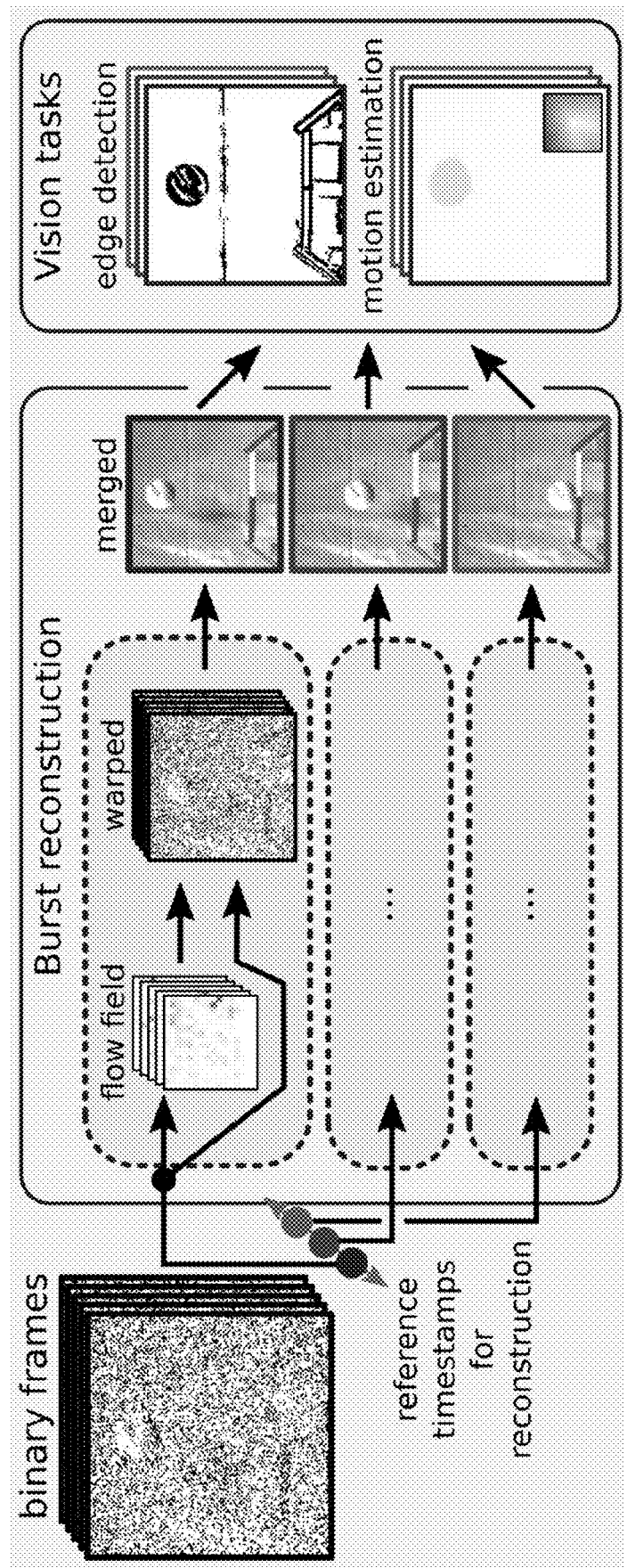
FIG. 1B shows an example of computer vision results generated from images of the same scene obtained using a quanta burst imaging technique.

FIG. 1B shows an example of computer vision results generated from images of the same scene obtained using a quanta burst imaging technique. The technique shown in FIG. 1B can be described as a Lagrangian vision pipeline based on frame-by-frame reconstruction as an intermediate step. Quanta burst imaging techniques are described in Ma et al., U.S. Pat. No. 11,170,549, which is hereby incorporated by reference herein in its entirety. As shown in FIG. 1B, quanta burst imaging can include: an alignment phase in which motion is estimated at a patch-level, which can be followed by a robust merging (sum) of the frames after compensating for the estimated motion (robustness can mitigate inaccurate motion estimates under shot noise). While high-quality frames can be obtained using quanta burst imaging techniques, these techniques generally incur heavy computational and memory/bandwidth costs.

Figure 1C:
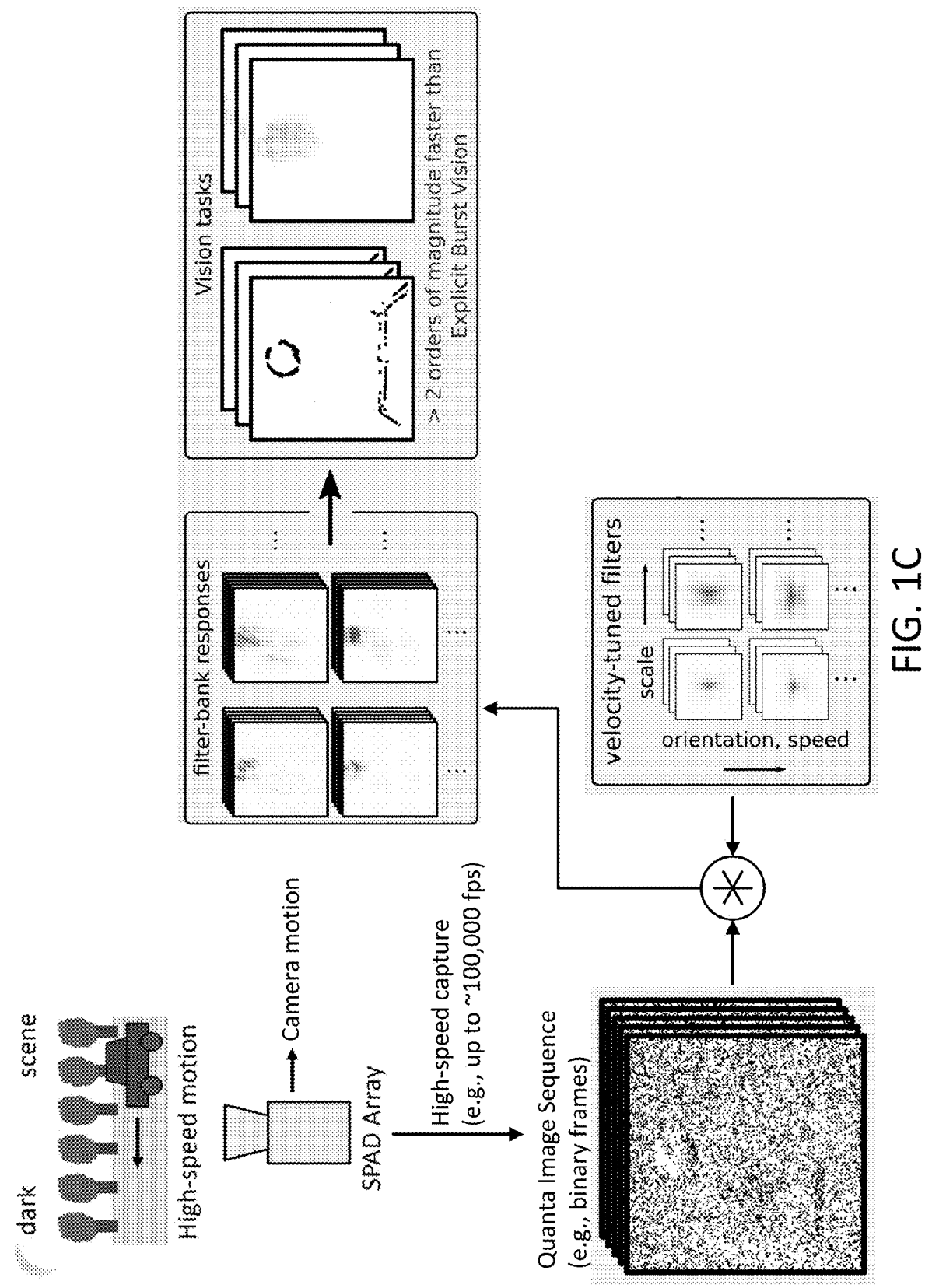
FIG. 1C shows an example of a flow for Eulerian single-photon computer vision in accordance with some embodiments of the disclosed subject matter.

FIG. 1C shows an example of a flow for Eulerian single-photon computer vision in accordance with some embodiments of the disclosed subject matter.

As shown in FIG. 1C, in some embodiments, mechanisms described herein can be used to implement an Eulerian vision pipeline. For example, a recorded photon stream can be processed in a single shot with a bank of velocity-tuned three-dimensional filters, followed by local pixel-wise computation to extract low-level information, such as edges and motion vectors. Such a single-pass technique can lead to less computation overall, and less data movement, than the pipeline shown in FIG. 1B for a fixed output frame rate.

In many computer vision tasks, a full image of the scene being analyzed is not necessary, and such computer visions tasks are therefore not necessarily tied to the same cost-versus-quality trade-off as image reconstruction. In some embodiments, mechanisms described herein can be used to perform signal phase recovery as a proxy for recovering information that can be recovered from image reconstruction, and which can be addressed without reconstructing the entire signal (image). Phase is an important feature both in visual perception and in vision tasks. In the context of video, local phase from oriented 3D filters can directly encode information about scene motion (e.g., as described below in connection with FIG. 5). In some embodiments, a family of 3D velocity-tuned filter banks can be used to extract phase information from single-photon sensor data. Multiple computer vision techniques are described herein that can be used to extract scene information (e.g., edges, motion) from recovered phase information. Such phase-based techniques can involve only linear filtering and pixel-wise operations, leading to extremely fast execution relative to image reconstruction-based approaches. As described below in connection with FIGS. 6-10, results using implementations of mechanisms described herein demonstrate computational speedups of more than two orders of magnitude as compared to an explicit burst vision approach with comparable quality (see, e.g., FIGS. 6-10).

In some embodiments, large differences in speed between explicit burst vision techniques (and other image reconstruction-based techniques) and mechanisms described herein can follow from the different perspectives the techniques take. For example, burst reconstruction can be considered a form of search: given a patch, the task is to find similar patches across the other frames of the video. Searching over long sequences incurs a high cost, exacerbated when repeating the search for every patch. The general idea of tracking the trajectory of a patch through the exposure volume can be analogized to a Lagrangian specification in fluid mechanics, that describes the motion of individual particles in a flow field. In contrast, mechanisms described herein can be analogized to Eulerian approaches in fluid mechanics, where properties of the flow (such as rate) are described at each point in space and time, without the notion of a particle.

As single-photon sensors become more widely used and specialized processor architectures have been developed for such sensors, the simplicity of a Eulerian approach can make it an attractive candidate for on-chip implementation, which can be advantageous in practical single-photon imaging due to the reduction in cost of data movement (e.g., if the data can be analyzed on the image sensor chip, transmission of the raw photon data from the image sensor chip can be omitted. In some embodiments, Eulerian single-photon vision techniques described hereine can be used to provide a general strategy for designing lightweight algorithms for extremely fast vision tasks, directly from raw single-photon data.

FIG. 1C shows a SPAD array observing a scene capturing a sequence of frames (e.g., binary frames) over time. The average incident flux at a pixel can be denoted by f[p] (in photons/second), where $p:=(i, j, n)$ represents the spatial location $(i, j)$ and temporal frame index n of the pixel. The number of incident photons can be modeled as a Poisson random variable, with mean f[p]. In some embodiments, during each frame exposure, a pixel can be limited to detecting at most one photon. Note that in some SPAD arrays, a single frame can be captured in which multiple photon detections are permitted, which can be used to generate multi-bit frames (e.g., with a number of detections within the frame capture time being recorded up to an upper limit). Additionally or alternatively, data from multiple frames (e.g., multiple binary frames, multiple multi-bit frames) can be combined (e.g., by summing the number of photon detections). Hence, the pixel measurements B[p] can be binary-valued and follow a Bernoulli distribution, which can be represented using the following relationships:

$$Pr(B[p]=0)=e^{-(\eta f[p]+d)\tau}$$

$$Pr(B[p]=1)=1-e^{-(\eta r[p]+d)\tau} \quad (1)$$

where the exposure time of each frame is r seconds, $\eta \in (0,1]$ is the quantum efficiency of the single-photon detectors, and d is the dark count rate (DCR) representing spurious detections unrelated to incident photons. It can be assumed that distinct quanta samples B[p] and B[p'] are statistically independent of each other.

In some embodiments, mechanisms described herein can be used to extract information from photon cube data captured by an array of single-photon detectors (e.g., a SPAD array). Since individual frames are extremely noisy and quantized (binary), in general, information must aggregated over sequences of multiple single-photon frames. However, simply summing frames over time results in potentially severe motion blur (e.g., depending on the composition of the scene), which makes it challenging to extract meaningful scene information from photon cubes. As described above, it is possible to explicitly compensate for motion via search-based burst photography-like techniques to reconstruct high-quality images from the photon cube, but such techniques are computationally- and bandwidth-intensive, and not amenable to real-time processing with current technology.

In some embodiments, mechanisms described herein can extract scene information directly from the photon cube, without an intermediate step of image reconstruction. In some embodiments, mechanisms described herein can be based on an analysis of motion as spatio-temporal orientation of intensity or phase iso-surfaces when viewing videos as 3D volumes. Motion information can be extracted through 3D oriented filters used. Such filters can be referred to as velocity-tuned filters, because filters at a given orientation in the 3D frequency domain only respond to movement at a particular range of velocities. In FIG. 1C, the hue shown in the depiction of velocity-tuned filters and the filter-bank response represents the phase of a complex valued number (e.g., having two values per pixel). As shown, the phase of the filters and responses can be undulating based on the wavelet shape of the impulse response function.

In some embodiments, a benefit of using velocity-tuned filters for single-photon video is that compared to frame-by-frame processing, 3D filters can aggregate information about the scene (including fine details and motion) over a large spatio-temporal support, leading to a large reduction in noise. Although it is still challenging to reconstruct the entire flux signal from the filter responses, the phase information is preserved sufficiently well in them to be used directly by downstream algorithms, despite strong noise and quantization in the raw photon cube. Note that it can be proved that for single-tone sinusoids the Fourier coefficient phases are unbiased under the imaging model described above in connection with EQ. (1) for almost all frequencies. Further, simulations described in Appendix A show that the variance of the Fourier coefficient phase is close to the Cramer-Rao lower bound on unbiased estimators. Both the proof and the simulation results are included in Appendix A, which is hereby incorporated by reference herein in its entirety. While velocity-tuned filters are not pure sinusoids, it can be expected that extracting the phase of such filters directly to be close to optimal (maximum-likelihood) estimation, given the resemblance of the filters to sinusoids. The particular cases of the low-level vision tasks of edge detection and motion estimation are described below in connection with FIGS. 5-10, for which velocity-tuned filter banks (as applied to single-photon data) were designed and analyzed.

Figure 2:
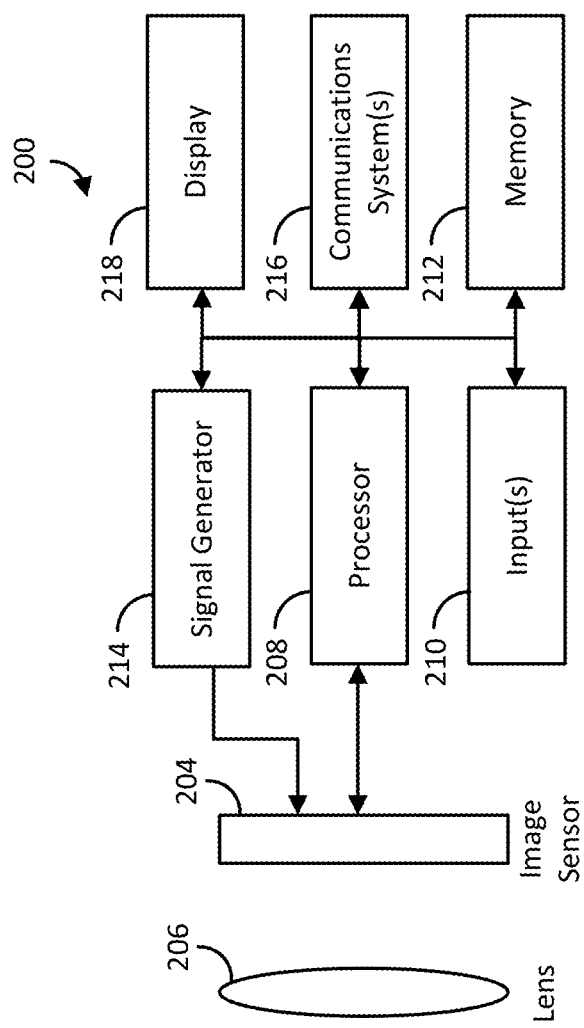
FIG. 2 shows an example of a system for Eulerian single-photon computer vision in accordance with some embodiments of the disclosed subject matter.

FIG. 2 shows an example 200 of a system for Eulerian single-photon computer vision in accordance with some embodiments of the disclosed subject matter.

As shown, system 200 can include an image sensor 204 (e.g., an area sensor that includes an array of single photon detectors); optics 206 (which can include, for example, one or more lenses, one or more attenuation elements such as a filter, a diaphragm, and/or any other suitable optical elements such as a beam splitter, etc.); a processor 208 that can be configured to control operations of system 200 which can include any suitable hardware processor (which can be a central processing unit (CPU), a digital signal processor (DSP), a microcontroller (MCU), a graphics processing unit (GPU), an accelerated processing unit (APU), etc.) or combination of hardware processors; an input device 210 (such as a shutter button, a menu button, a microphone, a touchscreen, a motion sensor, a liquid crystal display, a light emitting diode display, etc., or any suitable combination thereof); memory 212; a signal generator 214 that can be configured to generate one or more signals to control operation of image sensor 204; a communication system or systems 216 that can be configured to facilitate communication between system 200 and other devices, such as a smartphone, a wearable computer, a tablet computer, a laptop computer, a personal computer, a server, an embedded computer (e.g., for controlling an autonomous vehicle, robot, etc.), etc., via a communication link; and/or a display 218 that can be configured to present information (e.g., images, user interfaces, etc.) for consumption by a user. In some embodiments, memory 212 can store image data, and/or any other suitable data. Memory 212 can include a storage device (e.g., a hard disk, a Blu-ray disc, a Digital Video Disk, random access memory (RAM), read-only memory (ROM), electronically erasable read-only memory (EEPROM), etc.) for storing a computer program for controlling processor 208. In some embodiments, memory 212 can include instructions for causing processor 208 to execute processes associated with the mechanisms described herein, such as processes described below in connection with FIG. 5.

In some embodiments, image sensor 204 can be an image sensor that is implemented at least in part using an array of SPAD detectors (which can sometimes be referred to as a Geiger-mode avalanche diode) and/or one or more other detectors that are configured to detect the arrival time of individual photons. In some embodiments, one or more elements of image sensor 204 can be configured to generate data indicative of the arrival time of photons from the scene via optics 206. For example, in some embodiments, image sensor 204 can be an array of multiple SPAD detectors. As yet another example, image sensor 204 can be a hybrid array including SPAD detectors and one or more conventional light detectors (e.g., CMOS-based pixels). As still another example, image sensor 204 can be multiple image sensors, such as a first image sensor that includes an array of SPAD detectors that can be used to generate information about the brightness of the scene and a second image sensor that includes one or more conventional pixels that can be used to generate information about the colors in the scene. In such an example, optics can be included in optics 206 (e.g., multiple lenses, a beam splitter, etc.) to direct a portion of incoming light toward the SPAD-based image sensor and another portion toward the conventional image sensor. In some embodiments, image sensor 204 can have an imaging plane upon which optics 206 can focus light from the scene.

In some embodiments, system 200 can include additional optics. For example, although optics 206 is shown as a single lens, it can be implemented as a compound lens or combination of lenses. Note that although the mechanisms described herein are generally described as using SPAD-based detectors, this is merely an example of a single photon detector. As described above, other single photon detectors can be used, such as jot-based image sensors.

In some embodiments, signal generator 214 can be one or more signal generators that can generate signals to control image sensor 204. For example, in some embodiments, signal generator 214 can supply signals to enable and/or disable one or more pixels of image sensor 204 (e.g., by controlling a gating signal of a SPAD used to implement the pixel). As another example, signal generator 214 can supply signals to control readout of image signals from image sensor 208 (e.g., to memory 212, to processor 208, to a cache memory associated with image sensor 204, etc.).

In some embodiments, system 200 can communicate with a remote device over a network using communication system(s) 216 and a communication link. Additionally or alternatively, system 200 can be included as part of another device, such as a smartphone, a tablet computer, a laptop computer, an autonomous vehicle, a robot, etc. Parts of system 200 can be shared with a device within which system 200 is integrated. For example, if system 200 is integrated with an autonomous vehicle, processor 208 can be a processor of the autonomous vehicle and can be used to control operation of system 200.

In some embodiments, system 200 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console, a peripheral for a game counsel (or any of the above devices), a special purpose device, etc.

Communications by communication system 216 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 200 and another device, such as a network link, a dial-up link, a wireless link, a hard-wired link, any other suitable communication link, or any suitable combination of such links.

In some embodiments, display 218 can be used to present images and/or video generated by system 200, to present a user interface, etc. In some embodiments, display 218 can be implemented using any suitable device or combination of devices, and can include one or more inputs, such as a touchscreen.

It should also be noted that data received through the communication link or any other communication link(s) can be received from any suitable source. In some embodiments, processor 208 can send and receive data through the communication link or any other communication link(s) using, for example, a transmitter, receiver, transmitter/receiver, transceiver, or any other suitable communication device.

Figure 3:
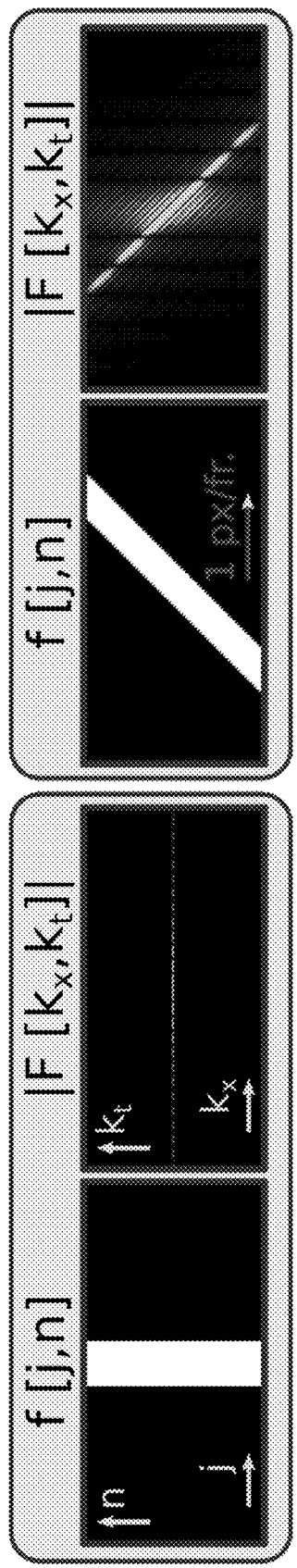
FIG. 3 shows examples of two-dimensional signals and corresponding two-dimensional velocity-tuned filters corresponding to the velocity.

FIG. 3 shows examples of two-dimensional signals and corresponding two-dimensional velocity-tuned filters corresponding to the velocity.

As shown in FIG. 3, velocity-tuning principles can be demonstrated using a 1D box-shaped signal imaged over time (vertical) at two speeds: in panel (a) v=0, and in panel (b) v=1 pixel/frame. In both cases, the 2D (x–t) spectrum lies along a line given by $k_t=-v\cdot k_x$. EQ. (3), described below, extends this to moving 2D signals (video) in the 3D frequency domain.

Figure 4:
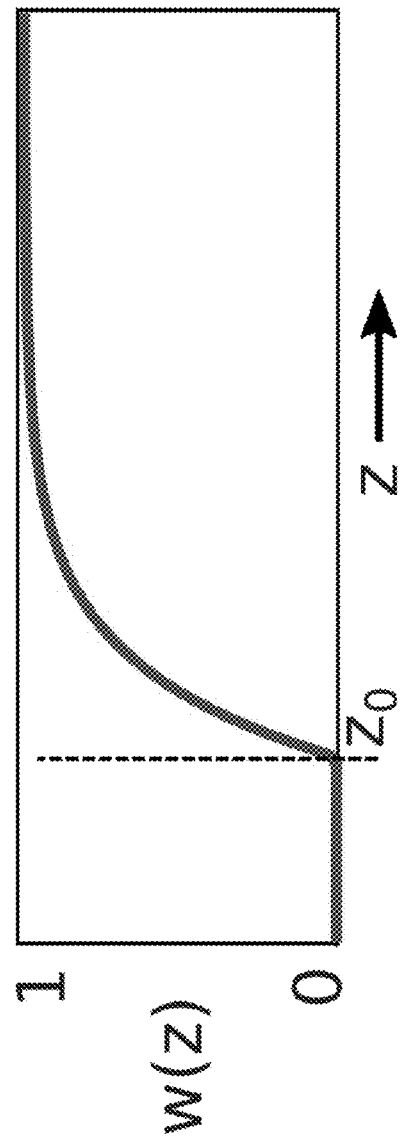
FIG. 4 shows an example of a weight function that can be used to determine a z-score for a response in accordance with some embodiments of the disclosed subject matter.

FIG. 4 shows an example of a weight function that can be used to determine a z-score for a response in accordance with some embodiments of the disclosed subject matter.

Consider three-dimensional complex linear filters $h_k$ applied to an input video stream of quanta samples B[p]:

$$R_k[p] := \Sigma_{q \in Su(h_k)} h_k[q] B[p-q] \qquad (2)$$

where $h_k$ is band-pass, tuned around the 3D frequency $k:=(k_x, k_y, k_t)$. Su(h) denotes the spatio-temporal support of h, p represents a possible data point location of possible data point locations and time (e.g., frame) instants, and $R_k[p]$ is the filter bank response generated by applying the filter to the samples from the stream of quanta samples B[p], where k in $R_k[p]$ represents one of the filters in the filter bank, tuned to a particular frequency (which can also be denoted using k). Note that h can represent a size of the filter, which can be in any suitable range. For example, h can be in a range of 2 pixels to 100 pixels in space, and in a range of 2 frames to a range of 5000 frames in time. As another example, h can be in a range of 3 pixels to 75 pixels in space, and in a range of 3 frames to a range of 2500 frames in time. As yet another example, h can be in a range of 3-50 pixels in space, and in a range of 3-2000 frames in time. As still another example, h can be in a range of about 3-5 pixels in space, and in a range of about 3-5 frames in time. As a further example, h can be in a range of about 30-50 pixels in space, and in a range of about 1000-3000 frames in time. In the context of video, 3D filters can be interpreted as being velocity-tuned, such that $h_k$ above can respond maximally to spatial patterns of frequency $(k_x, k_y)$ moving along the unit vector $$\frac{(k_x, k_y)}{\sqrt{k_x^2 + k_y^2}}$$

at a speed $$v_{normal} = \frac{-k_t}{\sqrt{k_x^2 + k_y^2}} \text{(velocity - tuning)} \quad (3)$$

FIG. 3 shows a simplified 2D example that can demonstrate this relation through the example of a moving one-dimensional signal (2D overall).

For computational efficiency, in some embodiments, log-Gabor filters (e.g., as described in Field, "Relations between the statistics of natural images and the response properties of cortical cells," International Journal of Computer Vision, 5(1):77-104 (1990), and Kovesi, "Image Features from Phase Congruency," Videre: Journal of Computer Vision Research, 1(3) (1999)) that are space-time separable.

For example, in some embodiments, spatial filters used in connection with mechanisms described herein can be polar-separable in the frequency domain (e.g., similar in shape to steerable filter-banks). Such filters can be tuned at equally-spaced orientations (e.g., in a range of 2-12 orientations, in a more particular example the filters can be equally-spaced at six different orientations, at two orientations, at three orientations, at four orientations, at five orientations, at seven orientations, at eight orientations, at nine orientations, at ten orientations, at eleven orientations, at twelve orientations, etc), and constructed at multiple scales (e.g., in a range of 2-6 scales, in a more particular example at two scales, at three scales, at four scales, at five scales, at six scales, etc.). Note that the scale and/or number of scales can be different along the spatial dimensions (e.g., along x,y), and along the temporal dimensions (e.g., t), which can be treated separately/independently because the relation can vary with the video content, through the velocity-tuning formula. For example, the filter design can be any suitable combination of spatial and temporal scale (e.g., coarse spatial and temporal scales, coarse spatial scale and fine/fast temporal scale, fine spatial scale and fine/fast temporal scale, fine spatial scale and coarse temporal scale, etc.).

In some embodiments, the radial bandwidth of filters can be any suitable range, such as approximately one to three octaves. In a particular example, radial bandwidth of filters can be two octaves. Note that a choice of bandwidth is relatively unlikely to make a substantial difference to system operations, and can be relatively small implementation detail. In some embodiments, the temporal filters can be adjusted separately for each scale, with the center frequencies $k_t$ obtained for a pre-specified set of velocities $\{0, v_1, v_2, \ldots\}$ through EQ. (3). In some embodiments, any suitable number of velocities can be used. For example, in the experiments described below, three velocities were generally used.

In some embodiments, filter responses can be used without sub-sampling the filter responses at coarse scales (e.g., unlike pyramid representations). This can simplify the implementation of algorithms as no interpolation is needed to get back to the native sensor resolution, but at the cost of higher memory usage. For example, an over-completeness factor can be calculated as 2×#scales×#orientations× #speeds. Using more memory-efficient representations can bring further cost reductions in the future.

Since individual SPAD samples are binary and noisy, filter-banks that can extract relevant details while rejecting spurious responses (which tend to dominate the data) as much as possible are desirable. In some embodiments, robustly estimating the noise and/or uncertainty in the filter responses can facilitate more accurate rejection of spurious responses.

From the central limit theorem, the response $R_k[p]$ of EQ. (2) can be expected to be approximately (complex) normally-distributed, with a variance:

$$\text{Var}[R_k[p]] = \Sigma_{q \in Su(h_k)} |h_k[q]|^2 \cdot \text{Var}(B[p-q]) \quad (4)$$

This variance can be approximated by assuming an ideal sensor where quantum efficiency $\eta=1$ and the dark counts $d=0$. Then it follows from EQ. 1 that $\text{Var}(B[p])=V(f[p])$, where $$V(x) := e^{-x}(1-e^{-x}).$$

From an estimate $\hat{c}[p]$ of the local average flux (through a blur kernel on $B[p]$), EQ. (4) can be approximated further using the following representation:

$$V_k[p] := V(\hat{c}[p])\Sigma_q |h_k[q]| \approx \text{Var}(R_k[p]). \quad (5)$$

The sum $\Sigma_q |h_k[q]|^2$ is known. In some embodiments, at run-time, $R_k[p]$ can be converted to a $$z\text{-score } z_k[p] := \frac{|R_k[p]|}{\sqrt{V_k[p]}}.$$

Additionally or alternatively, in some embodiments, the z-score can be mapped to a weight $w \in [0,1]$ as $w(z):=1-\exp(-\max(0, z-z_0))$, for example, as shown in FIG. 4. In some embodiments, the parameter $z_0$ can be set ahead-of-time (e.g., within a range including 2 to 6), which can ensure that weak responses do not contribute. In some embodiments, the z-score can be used as a secondary input in a computer vision task as an indicator of reliability of the responses (e.g., which can be provided in the input without modification). Note that the downstream computer vision task does not necessarily need to scale the response based on the z-score directly (though it is one possibility). For example, a motion estimation technique can ignore raw response magnitudes, and can be based on the z-score and response phase.

From the Gabor uncertainty relation, smaller band-width corresponds to larger spatio-temporal support (e.g., for coarse scales, or for elongated filters with small angular sensitivity). Typically such filters have lower variance in EQ. 4, but also exhibit poor localization, resulting in a classic trade-off. Ultimately, the filter performance depends on the true extent of the signal structures (e.g., edges).

A pervasive fact of single-photon vision is that the noise level changes with light levels, so a reliable filter in strong light can become unreliable in low light. In some embodiments, filter designs and downstream algorithms can be configured to adapt to this variation, for example, via use of multi-scale filter-banks. The use of z-scores further can further facilitate techniques to adapt to changes in noise (e.g., due to ambient light levels).

Figure 5:
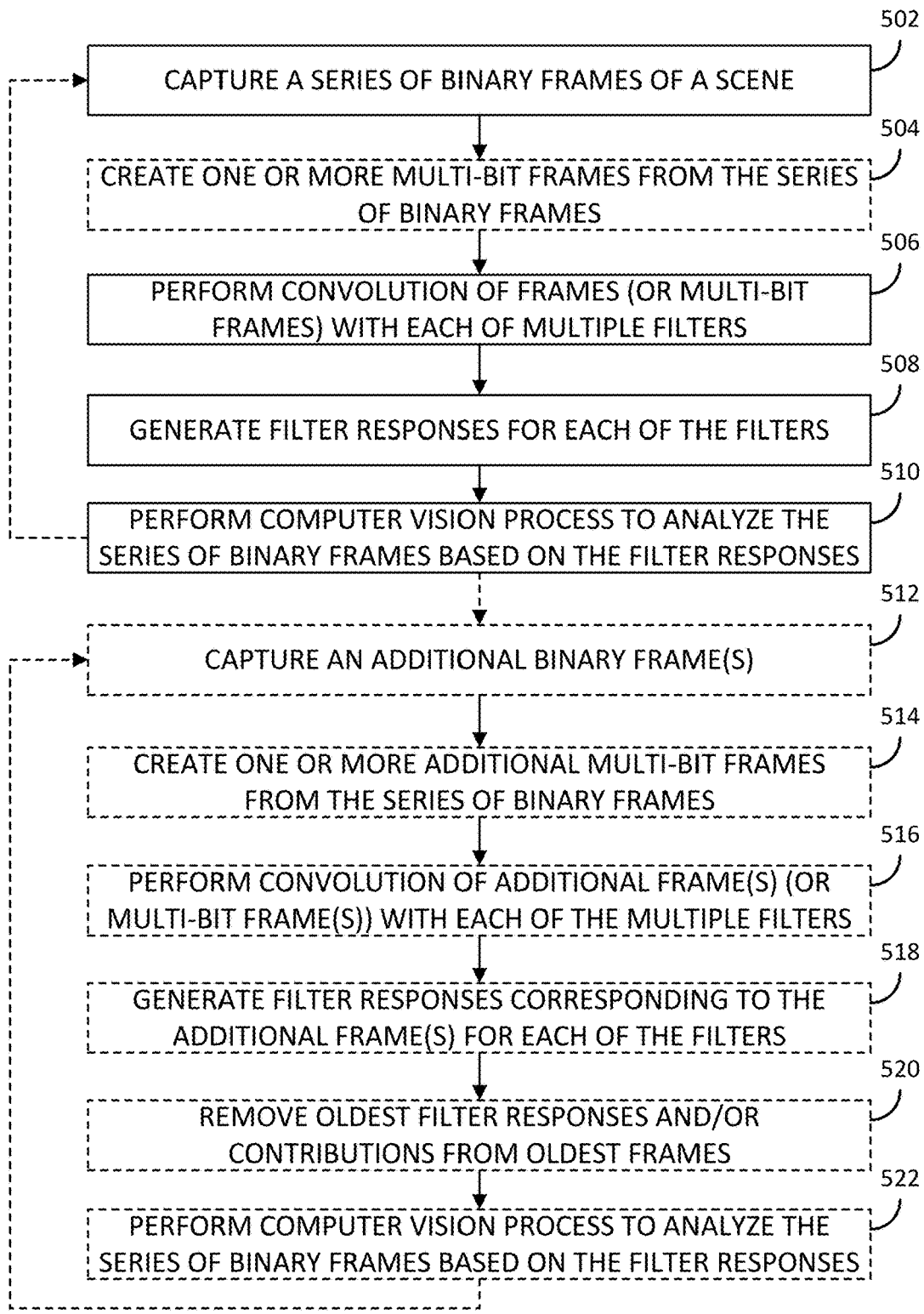
FIG. 5 shows an example of a process for Eulerian single-photon vision in accordance with some embodiments of the disclosed subject matter.

FIG. 5 shows an example 500 of a process for Eulerian single-photon vision in accordance with some embodiments of the disclosed subject matter.

At 502, process 500 can capture a sequence of binary frames of a scene using any suitable image sensor. For example, as described above in connection with FIGS. 1C and 2, the image sensor can be a SPAD-based image sensor, or a jot-based image sensor. However, these are merely examples, and mechanisms described herein can be used to facilitate computer vision tasks using any sensor that includes single photon detectors.

In some embodiments, process 500 can cause the sequence of frames can be captured at any suitable frame rate and/or within any suitable time budget. For example, process 500 can cause the sequence of frames to be captured with a high frame rate in situations where there is likely to be scene motion and/or high scene intensity. In a more particular example, the frame rate can set between about 300 frames per second (fps) and about 100,000 fps for current SPAD-based image sensors. As another more particular example, the frame rate can set between about 10 fps and about 1,000 fps for current jot-based image sensors.

In some embodiments, the total time budget can be in a range from about 1 millisecond to about 1 second. In a particular example, the total time budget can be in a range from about 10 milliseconds (ms) to about 100 ms for scenes with relatively high dynamic range. In some embodiments, the total time budget can be constrained based on the amount of motion in the scene, as it is more difficult to generate a high quality image for scenes with more motion for longer time budgets and/or more binary frames, especially if an object moves outside of the scene during the time budget. Additionally, in some embodiments, the total time budget can be constrained based on the amount of available memory, as a longer time budget and/or more binary frames requires additional memory availability that can be written to at speeds that are comparable to the frame rates of the image sensor.

In some embodiments, the total time budget can be omitted, and a stream of binary frames can be captured, with a sequence of binary frames corresponding to a particular time period selected after the frames have already been captured. For example, process 500 can cause binary frames of a scene to be captured continuously, and a sequence of frames can be selected from the continuously captured sequence at any suitable time for use in a computer vision task. As another example, process 500 can cause binary frames of a scene to be captured continuously, and as frames are captured, process 500 can continuously analyze the newest frame (e.g., as described below in connection with 506 and/or 508), and information from an oldest frame can be omitted (e.g., deleted, replaced, no longer considered, flagged for overwriting, etc.) from use in a computer vision task.

In some embodiments, at 502, process 500 can capture a series of multi-bit frames of the scene using any suitable image sensor. For example, an image sensor can be configured to record up to any suitable number of photon arrivals during a frame (e.g., recording up to one photon arrival can be used to generate a binary frame, recording up to two to three photon arrivals can be used to generate a 2-bit frame, recording up to seven photon arrivals can be used to generate a 3-bit frame, etc.).

At 504, process 500 can create one or more multi-bit frames from the series of binary frames. Additionally or alternatively, in some embodiments, process 500 can create one or more longer multi-bit frames from a series shorter multi-bit frames.

In some embodiments, process 500 can determine a number of binary (or multi-bit) frames to use to create a multi-bit frame using any suitable criteria or combination of criteria. For example, process 500 can combine frames to target a maximum amount of motion in each multi-bit frame to be no greater than one pixel per frame, which can mitigate blurring in the combined frame. In some embodiments, process 500 can use any suitable technique or combination of techniques to determine an amount of movement in a scene and/or a number of frames to combine to correspond to about one pixel per frame of movement. For example, process 500 can evaluate the data in the frequency domain (e.g., based on a Fourier transform), and blur can be apparent by an absence of high-frequency information in the Fourier domain. In some embodiments, 504 can be omitted (e.g., where movement in the scene is below 1 pixel per frame, or where every binary frame is processed as a binary frame).

At 506, process 500 can perform a convolution of the binary frames (or multi-bit frames) with each of multiple filters in a filter bank. For example, as shown in FIG. 1C, a convolution between each binary frame in a sequence of binary frames and each velocity-tuned filter can be performed. For example, this can be 3D convolution that is similar to a convolution performed in convolutional neural networks. In some embodiments, any suitable stride can be used in the convolution. For example, the convolution can use a stride of 1. As another example, the convolution stride can be set relative to the tuning frequency of the filter. In a more particular example, coarse-scale (e.g., low-frequency) responses can be taken at larger strides (e.g., a lower sampling rate) without losing information. Note that the filters can be applied in the frequency-domain (e.g., implicitly assuming periodic boundary conditions).

At 508, process 500 can generate filter responses for each of the filters based on the results of the convolution between the filter and the binary frame (or multi-bit frame) information. For example, each filter can produce a response corresponding to each pixel. In a more particular example, if there are N filters and the video includes X pixels per frame, the responses can include N×X values. As another example, each filter can produce less than one response corresponding to each pixel (e.g., with a stride greater than 1 pixel and/or frame). In some embodiments, process 500 can generate a filter response corresponding to each frame in the sequence of frames captured at 502 and/or for each multi-bit frame created at 504. In some embodiments, the filter response can be a feature map based on the results of the convolution between the filter and one or more binary frames.

At 510, process 500 can perform any suitable computer vision process or processes to analyze the series of binary frames based on the filter responses generated at 508.

In some embodiments, at 510, process 500 can utilize a phase-based technique to perform an edge detection computer vision process. Additionally or alternatively, in some embodiments, at 510, process 500 can utilize a phase-based technique to perform a motion estimation computer vision process. These algorithms can be described as Eulerian since no search is performed, and only local information is used, with most of the computations being pixel-wise, and therefore easily parallelizable. Note that these techniques can be operated y directly processing sequences of single-photon frames without expensive image or video reconstruction, which can increase the speed at which computer vision tasks can be performed on single-photon data.

In some embodiments, process 500 can perform an edge detection computer vision process, which can be based on temporal phase congruency. Phase congruency is the insightful observation that features like edges are discontinuities where the phase of all frequency components in the signal align. Phase congruency also applies to video, as a moving edge traces a plane in 3D through time. In this case a multi-scale bank of velocity-tuned filters can play the role of the frequency components and temporal phase congruency (TPC) can be detected. The tuned frequency k of one filter of a multi-scale bank of filters can be represented as $(k_x, k_y, k_t) = s\hat{k}$, where s denotes the scale and $\hat{k} := (\sin \phi \cos \theta, \sin \phi \sin \theta, \cos \phi)$ the unit vector along its spatio-temporal orientation $(\theta, \phi)$, where $\theta$ and $\phi$ can be spherical coordinates with $\theta$ corresponding to an angle in the x,y plane deflected from x=0 and $\phi$ corresponding to an angle in the time dimension deflected from x,y=0. the phase congruency PC along this direction can be represented as:

$$PC_{\hat{k}}[p] := \left( \frac{\left| \sum_s R_{s\hat{k}}[p] \right|}{\sum_s |R_{s\hat{k}}[p]|} \right)' \quad (6)$$

which is 1 if the responses at all scales have the same phase. In some embodiments, EQ. (6) can be adjusted to be $1 - \cos^{-1}(PC)$ when the responses at all scales have the same phase, as it can better localize features. For example, adjustments to EQ. (6) can be made based on the discussion in Kovesi, "Image Features from Phase Congruency", which can better handle blurred features. Note that phase congruency is a normalized quantity, invariant to any scaling of the amplitudes (such as due to light level). The above expression in EQ. (6) uses phase information only implicitly, which avoids the phase wrapping issue.

In some embodiments, once $PC_{\hat{k}}$ is computed for all orientations, process 500 can estimate edge strength using (3-dimensional) principal component analysis, which can be implemented efficiently using a closed-form expression for the eigenvalues of a 3×3 matrix (e.g., based on the description in Kopp, "Efficient Numerical Diagonalization of Hermitian 3×3 matrices," International Journal of Modern Physics C, 19(03):523-548 (2008) and Smith, "Eigenvalues of a Symmetric 3×3 matrix," Communications of the ACM, 4(4):168 (1961). In some embodiments, the second eigenvalue (when significant) can be indicative of space-time "corners" in the 3D volume.

In some embodiments, in the noisy conditions of single-photon sensing, the right-hand side of EQ. (6) can be multiplied by the weight term described above in connection with FIG. 4, which can exclude orientations with weak responses (e.g., $z_0$ was set to 2 for all edge detection experiments described below).

In some embodiments, process 500 can perform a motion estimation computer vision process that estimates edge normal velocities, which can be based on temporal phase congruency. Such information can be used to estimate normal velocities from 3D edge orientation estimates. Since the principal direction yielded by temporal phase congruency is in 3D (it is the normal to the plane traced out by a moving edge over time), process 500 can also directly receive normal velocity estimates at the edge locations, which are similar to the optical flow obtained from event cameras. Additional description of these estimates is included below in connection with FIG. 9.

In some embodiments, process 500 can perform a motion estimation computer vision process, which can be based on local frequency information. In some embodiments, a filter at spatio-temporal frequency k can be defined, and process 500 can estimate a velocity in the direction of k that is given by the instantaneous frequency (e.g., the gradient of the local phase $\arg(R_k[p])$). In some embodiments, the instantaneous frequency can be represented as $\tilde{k} := \tilde{s} \cdot (\sin \tilde{\phi} \cos \tilde{\theta}, \sin \tilde{\phi} \sin \tilde{\theta}, \cos \tilde{\phi})$, the component velocity $v_n$ is in the spatial direction $\tilde{\theta}$, and given as $v_n = \cot \tilde{\phi}$. To obtain the 2D velocity (optical flow) $(v_x, v_y)$ at a pixel, process 500 can form phase constancy equations from component estimates:

$$v_x \cos \tilde{\theta} + v_y \sin \tilde{\theta} = \cot \tilde{\phi} \quad (7)$$

In some embodiments, process 500 can obtain one equation from each reliable filter response, which can then be put together and solved as a weighted least-squares problem, with the weights described above in connection with FIG. 4 (the threshold $z_0$ was set to 6 for optical flow experiments described below). Appendix A, which has been incorporated by reference herein, include additional implementation details. In some embodiments, such a motion estimate can be applied independently at each scale. The role of scale is described below in connection with FIG. 8.

In some embodiments, process 500 can perform 502-510 on any suitable block of frames. For example, process 500 can divide the sequence of binary frames captured at 502 into any suitable number of blocks. In some embodiments, the sequence of binary images can be divided into blocks of a particular size (e.g., blocks of 50 to 10,000 frames for frame rates up to 100,000 fps, blocks corresponding to about 10 milliseconds of total exposure time, etc.). In some embodiments, blocks can include at least a minimum number of binary frames to ensure that when convolved with filters at 506, sufficient information is included in filter responses. For example, in some embodiments, each block can include at least 20 binary frames. As another example, in a particular range of light levels (e.g., around 1 photon/pixel), each block can include a single binary frames.

In some embodiments, process 500 can be subject to some latency, for example, corresponding to at least a time between when a first binary frame in a block of binary frames being analyzed is captured, and a time when a last binary frame in a block of binary frames being analyzed is captured.

In some embodiments, process 500 can return to 502, and can begin capturing additional binary frames of the scene after performing the computer vision process(es) at 510, or in parallel as 504-510 are performed. In such embodiments, process 500 can analyze discrete blocks of frames (e.g., a first block of frames can be analyzed beginning at a first time, and a second block of frames that does not include any of the frames included in the first block of frames can be analyzed beginning at a later second time).

Additionally or alternatively, in some embodiments, process 500 can move to 512 after performing (or initiating performance of) a computer vision process(es) at 510, and can capture an additional binary frame (or frames) of the scene.

At 514, process 500 can create one or more additional multi-bit frames from the series of binary frames. Additionally or alternatively, in some embodiments, process 500 can create one or more longer multi-bit frames from a series shorter multi-bit frames. In some embodiments, 514 can be omitted (e.g., where movement in the scene is below 1 pixel per frame, or where every binary frame is processed as a binary frame).

At 516, process 500 can perform a convolution of the additional binary frame(s) (or multi-bit frame(s)) captured at 512 to determine a contribution of that frame(s) to the filter responses generated at 508 (or in a previous iteration of 518) for each of multiple filters in a filter bank.

At 518, process 500 can generate one or more new filter responses corresponding to the additional frame(s) based on the convolution performed at 516, and in some cases, in part based on the convolution performed at 506 (or an earlier iteration of 516). For example, the results of the convolution of the filters with earlier frames in the series of frames can be added to the results of the convolution performed at 516 to generate a filter response for the current frame(s).

At 520, process 500 can remove and/or disregard the oldest filter responses (e.g., from memory) and/or the contributions to the oldest filter responses that have not been removed (e.g., by removing the contributions to the oldest filter responses from the oldest frames).

At 522, process 500 can perform any suitable computer vision process or processes to analyze the series of binary frames based on the filter responses generated/updated at 518 and/or 520. In some embodiments, process 500 can return to 512, and can capture additional binary frames of the scene after performing the computer vision process(es) at 522, or in parallel as 514-520 are performed. In such embodiments, process 500 can analyze an updating stream of frames (e.g., a first block of frames can be analyzed beginning at a first time, and a second block of frames that includes many of the same frames included in the first block of frames can be analyzed beginning at a later second time).

FIGS. 6 and 8-10 show examples demonstrating results generated using techniques described herein on real binary frame sequences captured with the SwissSPAD sensor, which has a 256×512 resolution and frame rate up to 97,700 fps. Flux levels are reported as photons-per-pixel, abbreviated as ppp.

Sequences with gradual motion (where the flow is <<1 pixel per frame, common with high frame rates) were temporally low-passed and sub-sampled, approximately equivalent to sampling with a multi-bit sensor. The set of tuned velocities was adapted accordingly.

The SPAD prototype is a research-grade device with several "hot pixels" with high dark count rate. These pixels were detected offline with a dark frame, and interpolated.

Filtering was done in frequency-domain due to the large support of the filters. For fair comparisons, the algorithms described herein and the techniques compared to (e.g., BM3D, made available by Tampere University of Technology at https(colon)//webpages(dot)tuni(dot)fi/foi/GCF-BM3D/index(dot)html; and burst reconstruction as described in Ma et al., U.S. Pat. No. 11,170,549) were implemented in MATLAB and run on CPUs.

Figure 6:
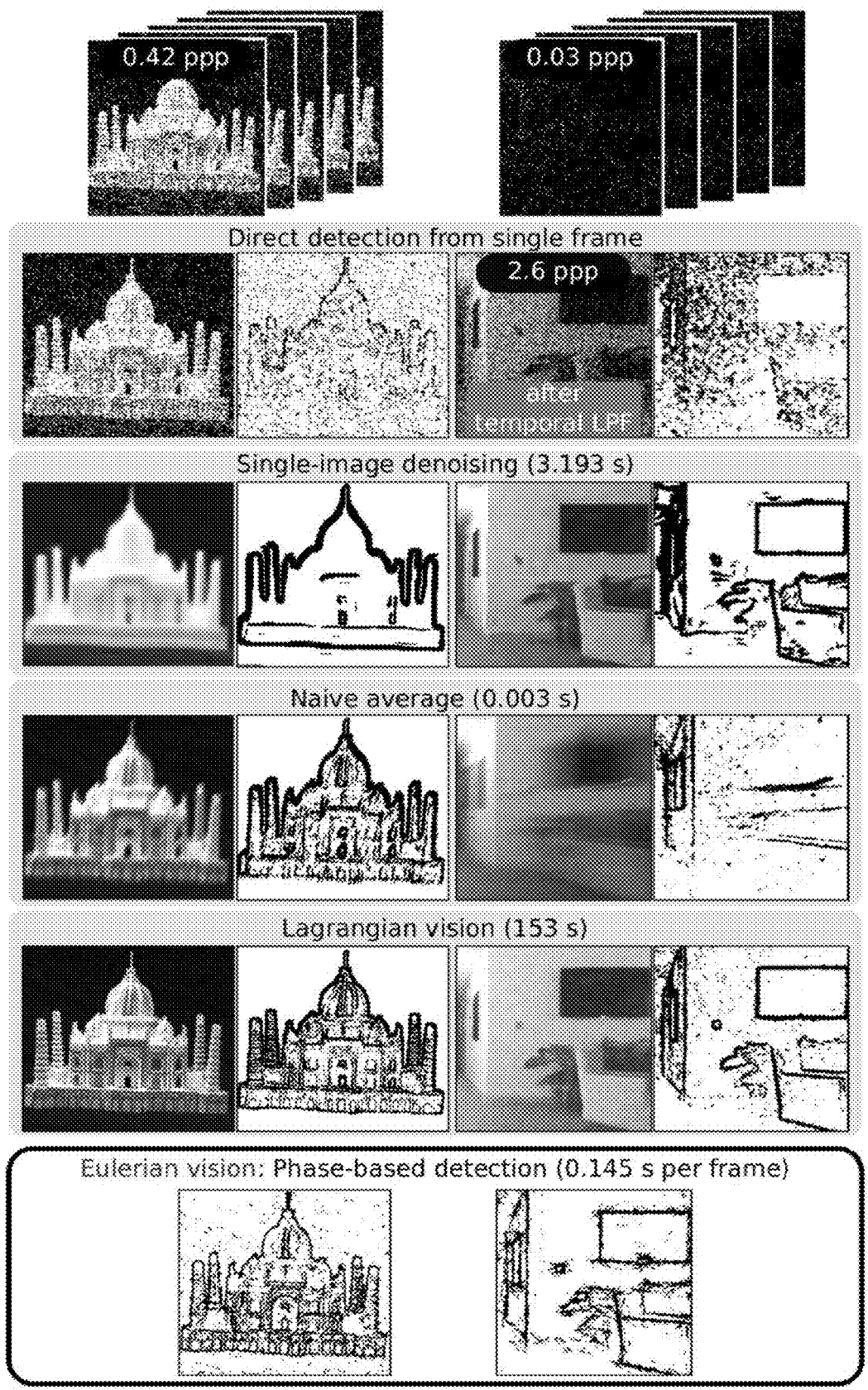
FIG. 6 shows examples of binary frames of two scenes, and edge detection results generated using various techniques, including techniques described herein for Eulerian single-photon computer vision.

FIG. 6 shows examples of binary frames of two scenes, and edge detection results generated using various techniques, including techniques described herein for Eulerian single-photon computer vision.

In FIG. 6, edge detection results on real SPAD video is shown. Binary frames from SwissSPAD (top) and edges from the Eulerian Temporal Phase Congruency algorithm (TPC, bottom) described above in connection with FIG. 5, compared against various reconstruction-based approaches (middle rows). Single-image denoising used BM3D and Lagrangian vision used burst photography. The Richer Convolutional Features detector was used for all reconstruction-based results. TPC recovered sharp edges even under noise and motion at a fraction of the cost of burst reconstruction (and faster than BM3D). Direct detection from a single frame and the naive average are fast, but suffer from the noise vs. motion blur tradeoff, respectively. Single-image denoising avoids motion blur but has over-smoothing artifacts resulting in loss of many edges.

The results shown in FIG. 6 show edges obtained by TPC from videos captured with the SwissSPAD sensor, lowpass-filtered to sequences of 120 frames. For comparison, results with reconstruction-based approaches are also presented, including the Lagrangian reconstruction-based approach of FIG. 1B. Richer Convolutional Features (RCF) were used as a representative frame-based edge detector for comparisons.

The Eulerian approach implemented in accordance with mechanisms described herein achieved similar-quality results as the Lagrangian technique, but was more than two orders of magnitude faster (e.g., performing an analysis in 0.145 seconds in the MATLAB implementation compared to 153 seconds for the Legrangian MATLAB implementation). The Eulerian approach was also faster than the tested BM3D implementation by an order of magnitude, in the same hardware and software environment.

Figure 7:
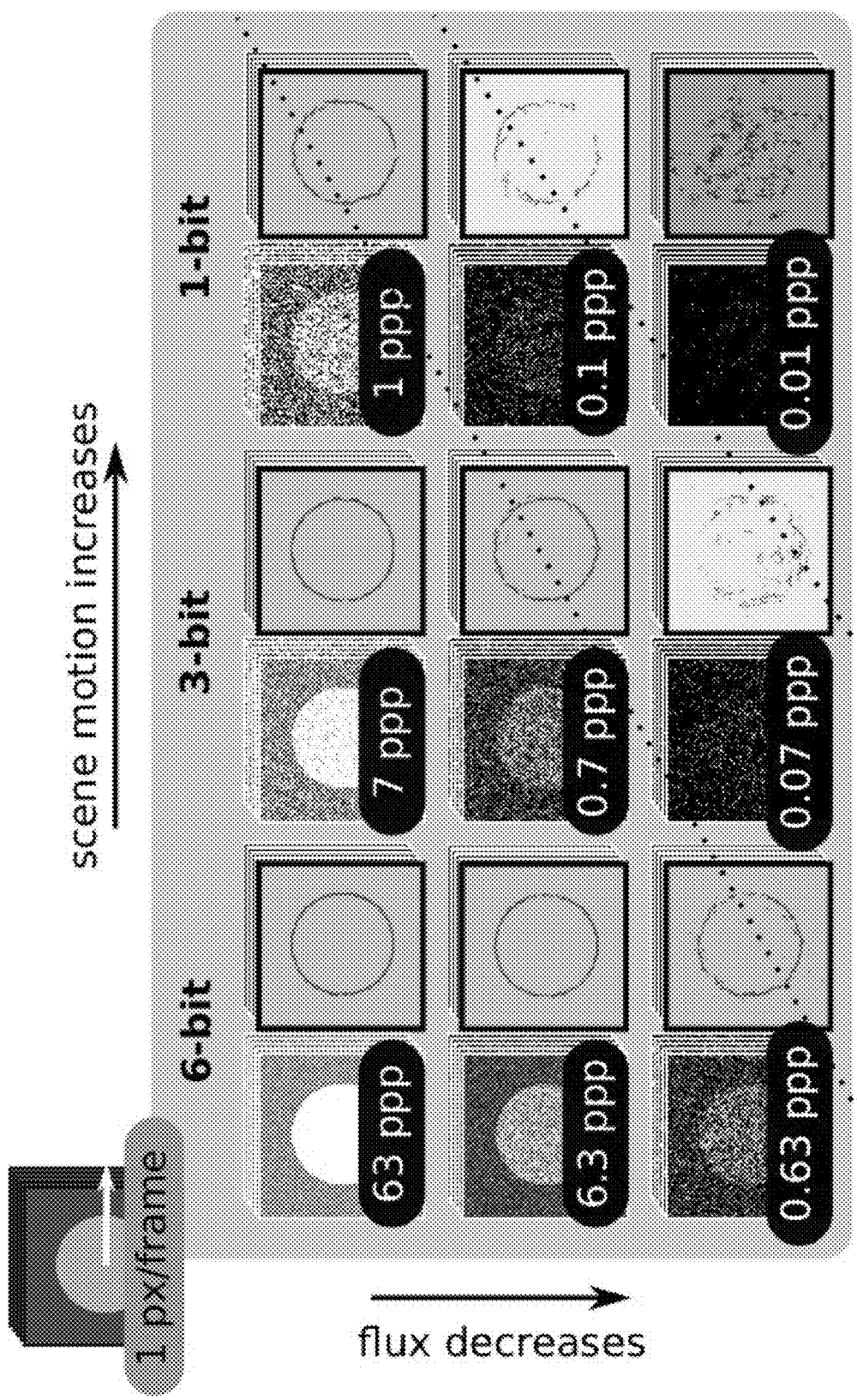
FIG. 7 shows examples of edge detection results generated using techniques described herein for Eulerian single-photon computer vision for various levels of frame averaging and various levels of scene flux in accordance with some embodiments of the disclosed subject matter.

FIG. 7 shows examples of edge detection results generated using techniques described herein for Eulerian single-photon computer vision for various levels of frame averaging and various levels of scene flux in accordance with some embodiments of the disclosed subject matter.

FIG. 7 demonstrates the influence of flux on edge detection in a simulated scene. A SPAD video with 51 frames of size 128×128, simulated with motion of 1 pixel per frame and at varying flux levels (in photons per pixel, ppp) and precision, with edges detected by temporal phase congruency are shown in FIG. 7. Edge recovery quality depends on the total incident flux (its contour lines are roughly the dotted diagonals), and if the flux is at least 1 ppp, edges can be detected even from binary video.

The performance of the edge detector depends on the light level in the scene as well as the amount of motion. Indeed, in slow-moving scenes, higher-precision data can be achieved with simple low-pass filtering. FIG. 7 shows this variation for the TPC detector with a fixed filter-bank, with a simulated synthetic scene. An ideal sensor was assumed with no dark counts and full quantum efficiency. Even under extremely challenging conditions (1-bit samples and motion), TPC successfully recovered edges. The recovery ultimately depends on the total number of incident photons, with flux levels as low as ~1 photon-per-pixel being sufficient for reasonable quality.

Figure 8:
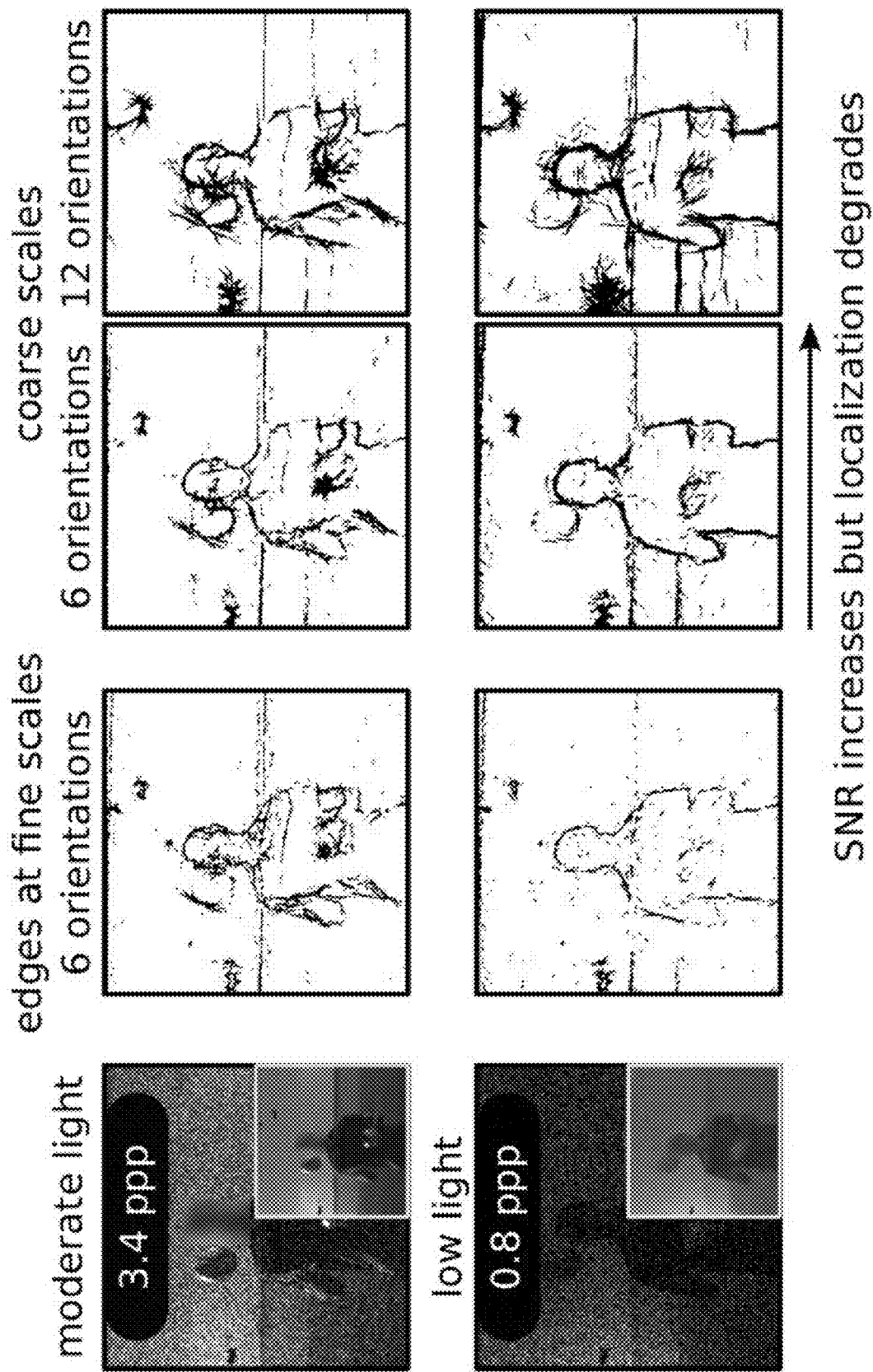
FIG. 8 shows examples of a binary frame of a scene at two flux levels, and edge detection results generated using techniques described herein for Eulerian single-photon computer vision using various numbers and coarseness of scaling in the filters in accordance with some embodiments of the disclosed subject matter.

FIG. 8 shows examples of a binary frame of a scene at two flux levels, and edge detection results generated using techniques described herein for Eulerian single-photon computer vision using various numbers and coarseness of scaling in the filters in accordance with some embodiments of the disclosed subject matter.

FIG. 8 demonstrates results of edge detection under varying filter configurations. A scene with non-rigid motion (a person juggling two footballs) was captured. Faces are blurred for privacy. In the top row, an input frame after temporal low pass filter is shown, and edges detected with temporal phase congruency over two scale ranges. Inset shows a tone-mapped burst reconstruction for reference. In the bottom row, an input frame from the same scene is shown from a re-recording under less light. The fine-scale edge map worsens significantly, but the coarse scale map retains quality. In the last column the angular bandwidth of the filters was reduced. Long edges are now recovered more reliably, but the detector overshot around curved edges such as the football, the head, and the elbows.

As described above in connection with EQS. (4) and (5), design of the filters is important, and can impact results. FIG. 8 shows a somewhat similar example as shown in FIG. 7, but with real data. In this example, the same controlled scene (a person juggling two footballs) was captured twice under different light conditions (moderate and low light). TPC was run with filter-banks having two different scale ranges: one spanning spatial wavelengths from 3 to 13 pixels ("fine scales"), and another spanning 6 to 28 pixels ("coarse scales"). Filters were created at six spatial orientation tunings $\{0°, 60°, \ldots, 300°\}$ and three velocity-tunings $\{0, 0.3, 1\}$ pixels/frame. The fine-scales filter-bank yielded sharp edges under more light, but suffered in low light. In contrast, the coarse-scale filters gave thicker (less resolved) edges, but were more reliable under low light. The SNR can be improved further by reducing the angular bandwidth of the filters, which helps with long edges but is prone to over-shooting around curved edges—this is another form of de-localization or loss of resolution. These results are consistent with the detection vs. localization trade-off which has been long-studied in the edge detection literature.

Figure 9:
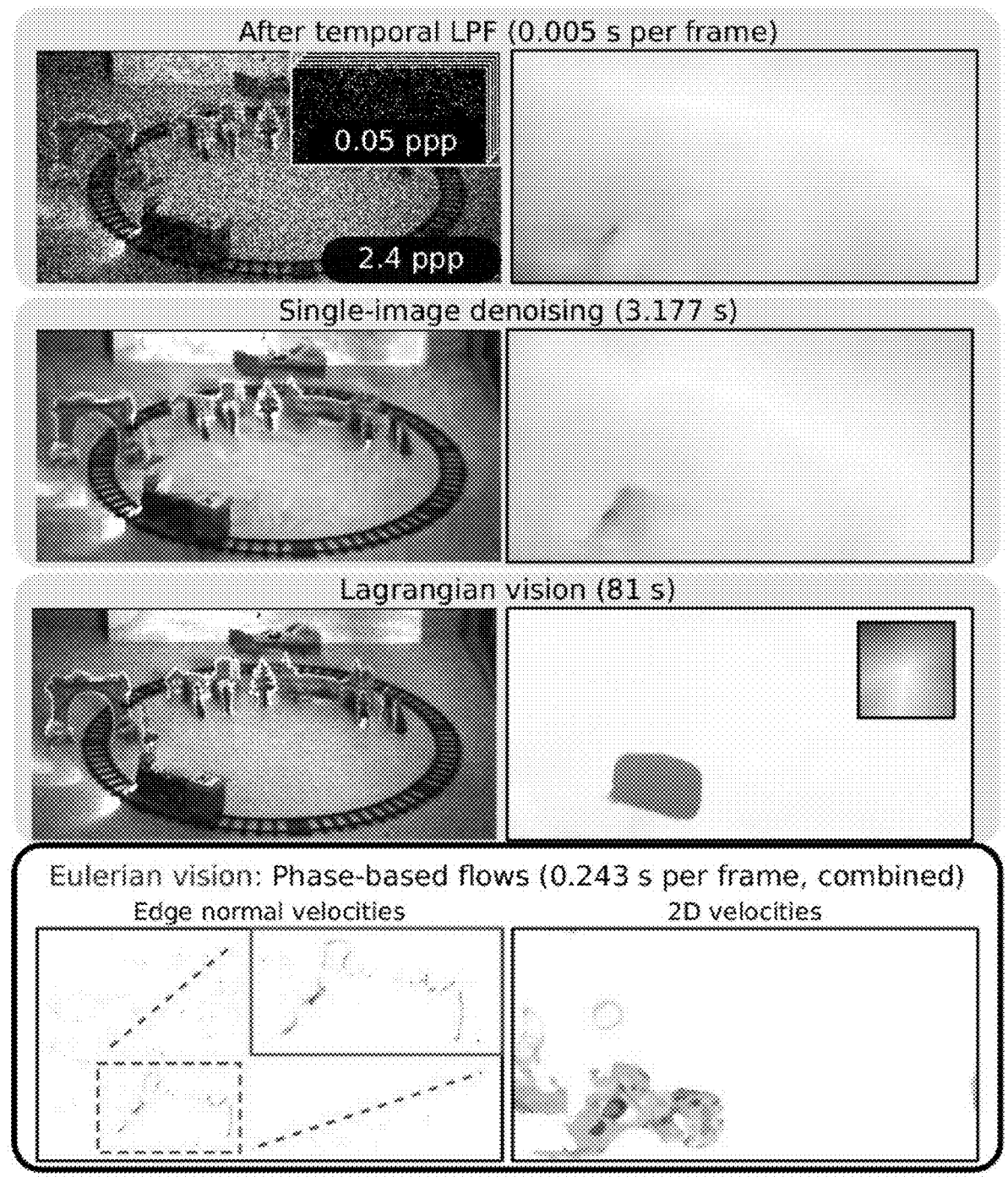
FIG. 9 shows examples of binary frames of a scene, and motion estimates generated using various techniques, including techniques described herein for Eulerian single-photon computer vision.

FIG. 9 shows examples of binary frames of a scene, and motion estimates generated using various techniques, including techniques described herein for Eulerian single-photon computer vision.

In FIG. 9, motion estimation from real SPAD video is illustrated. FIG. 9 shows a low light scene with a moving object (a toy train on a track), and optical flow estimates. Reference flows were estimated with RAFT-it. In the top row, a binary frame after temporal low-pass filtering (LPF) is shown (with originals inset) on the left, and an optical flow based on two binary frames is shown on the right. In the second row, a sample reconstructed image and optical flow results generated from a frame-by-frame denoising with BM3D are shown. In the third row, a sample reconstructed image generated using Lagrangian/explicit burst vision and optical flow results generated from reconstructed images are shown. In the bottom row, normal velocities from edges (magnified at top-right) extracted by temporal phase congruency, and 2D velocities from an implementation of the motion estimation computer vision process described above in connection with FIG. 5. The motion of the train is clearly isolated, unlike two-frame estimation directly or with BM3D. The Lagrangian technique provides good quality and reliability, but at considerably higher cost (in time).

FIG. 9 shows results from both edge normal velocities and 2D velocity estimation techniques described above in connection with FIG. 5 on a real SwissSPAD sequence. For comparison, RAFT-it, a state-of-the-art two-frame technique, was applied with and without image reconstruction. The results generated using implementations of mechanisms described herein are significantly better than directly applying RAFT-it on noisy frames, in that it can reliably separate the moving object from the static background. The results generated using implementations of mechanisms described herein also achieved considerably better performance as compared to single-image denoising, due to the temporal incoherence of denoising artifacts. The Lagrangian technique yielded the best quality results, but also at significantly higher cost.

One may notice from the phase-based 2D velocity estimates that the movement of the train's projected head-lights was also detected as motion, but RAFT-it ignored that and only segmented the train. This may be due to better higher-level knowledge in the learning-based technique, and motivates developing similar multi-frame or 3D flow estimators for single-photon sensors.

Figure 10:
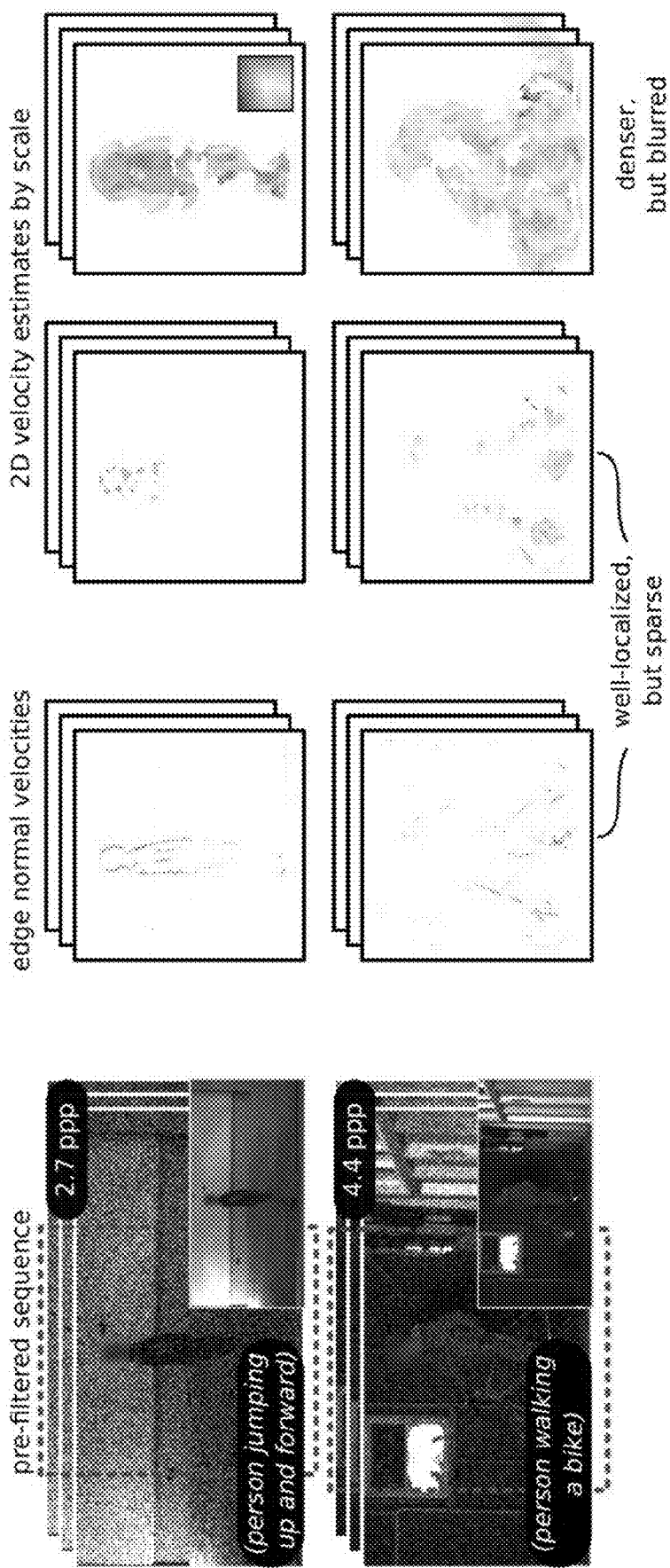
FIG. 10 shows examples of a binary frame of two scenes, and motion estimates generated using techniques described herein for Eulerian single-photon computer vision using various coarseness of scaling in the filters in accordance with some embodiments of the disclosed subject matter.

FIG. 10 shows examples of a binary frame of two scenes, and motion estimates generated using techniques described herein for Eulerian single-photon computer vision using various coarseness of scaling in the filters in accordance with some embodiments of the disclosed subject matter.

In FIG. 10, multiple velocity cues from multi-scale motion estimation and edge detection are illustrated. From left, SPAD sequences after pre-filtering are shown, then normal velocity estimates from 3D edge orientation based on temporal phase congruency, and 2D velocity estimates at two scales. Burst reconstruction using is inset for reference. Since coarser-scale filter responses have less noise, more reliable estimates were obtained from them compared to finer scales. This yields denser flow maps but with poorer localization. Edge velocities are naturally sparse, though the underlying algorithm (TPC) does use coarse-scale filters as well. The quality varies spatially with the local light level and image contrast, as expected from Poisson noise.

The fine-scale and the normal velocity estimates are better-localized but may not always be reliable due to noise. They can also suffer from the aperture problem. Coarse-scale estimates are more robust (the responses have a higher z-score) and suffer less from the aperture problem, but they are poorly localized and can bleed over object boundaries.

Implementations of Eulerian temporal phase congruency-based edge detection and edge normal velocity detection, and phase-based 2D motion were also evaluated quantitatively on simulated data, and compared to the single-image denoising-based approach which is faster than burst reconstruction. Those results are described in Appendix A, which has been incorporated herein by reference.

While single-photon sensors provide the prospect of recording visual details at the resolution of individual photons, they also introduce challenges: a very noisy and quantized imaging model, and extremely large volumes of data generated, resulting in prohibitive compute and bandwidth requirements. In some embodiments, mechanisms described herein can be used to implement relatively light-weight vision algorithms based on linear filtering and local phase-based processing of raw single-photon data, bypassing the expensive intermediate step of image reconstruction.

In some embodiments, mechanisms described herein can be used to implement at least a portion of a computer-vision pipeline on a single-photon detector-based image sensor. As new hardware architectures are developed for single-photon sensors that can perform complex calculations at the photon-level, mechanisms described herein can facilitate completely on-chip real-time photon-processing, as the photons are captured. This is made possible by the computational simplicity of mechanisms described herein. In some embodiments, mechanisms described herein can be implemented with better memory efficiency by performing filtering fully on-line (e.g., through exponential smoothing), such that memory of past frames is not required. Such on-chip Eulerian vision systems can facilitate widespread deployment of single-photon imaging in real-world computer vision applications, including SLAM, scientific fields like bio-mechanics, and in consumer domains like sports videography.

As described above, a specific family of velocity-tuned log-Gabor filters have been described in connection with mechanisms described herein. In some embodiments, better and more efficient filters can be obtained by formulating appropriate loss functions for the downstream vision task, including filters learned end-to-end from data. Additionally or alternatively, in some embodiments, 3D gradients and monogenic filters can be used very similarly as phase, with the Canny edge detector (and its 3D counterpart), and the Lucas-Kanade optical flow estimator being classic algorithms that can be adapted for use with mechanisms described herein. Such techniques can be expected to run faster than the phase-based techniques described herein, since fewer filters are needed. Apart from SNR and localization, which are standard optimization criteria in this setting, other relevant constraints such as causality and resource cost may impact which types of filters are suitable for a particular computer vision application.

In general, velocity-tuned filters operate under the local linear-motion assumptions, which may be violated by sudden appearances or disappearances of objects. In some embodiments, explicit occlusion reasoning, as done in more modern optical flow techniques, can be used in certain practical implementations to mitigate errors that may be caused violation of the linear-motion assumptions.

As described herein, reconstructing high-SNR input (e.g., high SNR reconstructed images) is not always necessary for visual tasks. A related notion is the prospect of any-time results, which improve as the algorithm runs for longer. In some embodiments, the filter-bank scale can be considered as the equivalent of time, as information gets aggregated over wider volumes, but the algorithms attempt to detect features fine scales. In some embodiments, mechanisms described herein can be used in connection with diffusion-based algorithms, which may have even lower compute and bandwidth costs on specialized architectures.

Further Examples Having a Variety of Features

Implementation examples are described in the following numbered clauses:

1. A method for facilitating single-photon computer vision tasks, the method comprising: causing an image sensor to generate a sequence of images representing a scene, each of the images comprising a plurality of pixels, wherein the image sensor comprises a plurality of detectors configured to detect arrival of individual photons, the plurality of detectors arranged in an array; performing, for each of a plurality of three dimensional filters, a convolution between the three dimensional filter and a plurality of frames, wherein each of the plurality of frames is based on one or more of the images of the sequence of images; generating, for each of the plurality of frames, a plurality of filter bank responses each corresponding to a three dimensional filter of the plurality of three dimensional filters; and performing a computer vision process based on the plurality of filter responses.

2. The method of clause 1, wherein each of the plurality of detectors comprises a single photon avalanche diode (SPAD).

3. The method of any one of clauses 1 or 2, wherein each image of the sequence of images comprises a binary image that represents photons detected by the image sensor during an exposure time T.

4. The method of any one of clauses 1 to 3, wherein each of the plurality of three dimensional filters comprises a velocity tuned filter, and wherein a first subset of the plurality of three dimensional filters are tuned to a three dimensional frequency $k:=(k_x, k_y, k_t)$, where $k_x$ and $k_y$ represent spatial patterns, and $k_t$ represents a pattern in time, each of the three dimensional filters of the first subset having a different scale.

5. The method of any one of clauses 1 to 4, further comprising: determining a z-score for each of the plurality of filter bank responses; mapping each z-score to a weight associated with the respective filter bank for which the z-score was determined; and utilize the weighted filter bank responses to perform the computer vision process based on the plurality of filter responses 6. The method of clause 5, further comprising: estimating a variance value $Var(R_k[p])$ using a relationship $V_k[p]:=V(c[p])\Sigma_q|h_k[q]|^2$, where $R_k[p]$ is a filter bank response generated by applying a filter $h_k[q]$ to the plurality of frames $B[p]$, $V(\hat{c}[p])$ is a variance of an estimated local average flux over $B[p]$, and $\Sigma_q|h_k[q]|^2$ is a sum of the filter $h_k[q]$ over $q<p$; and determining the z-score using a relationship $$z_k[p] := \frac{|R_k[p]|}{\sqrt{V_k[p]}}.$$

7. The method of clause 6, further comprising: mapping each z-score to a weight associated with the respective filter bank for which the z-score was determined using a relationship $w(z):=1-\exp(-\max(0, z-z_0))$, where $z_0$ comprises a threshold z-score.

8. The method of any one of clauses 1 to 7, wherein the computer vision process is an edge detection process based on a phase congruency associated with each of the plurality of filter responses.

9. The method of clause 8, further comprising: detecting one or more corners based on the phase congruency associated with each of the plurality of filter responses.

10. The method of clause 1, wherein the computer vision process is a motion estimation process based on a phase constancy relationship.

11. The method of clause 1, wherein the computer vision process is a motion estimation process, and the method further comprises: performing the computer vision process for each of the plurality of pixels based on a phase constancy relationship $v_x \cos \tilde{\theta} + v_y \sin \tilde{\theta} = \cot \tilde{\phi}$, where $(v_x, v_y)$ is a velocity at the respective pixel, $v_n = \cot \tilde{\phi}$ is a component velocity of a respective three dimensional filter $\tilde{k}$ in a spatial direction $\tilde{\theta}$, and $\tilde{k}:=\tilde{s} \cdot (\sin \tilde{\phi} \cos \tilde{\theta}, \sin \tilde{\phi} \sin \tilde{\theta}, \cos \tilde{\phi})$, where $(\tilde{\theta}, \tilde{\phi})$ is a spatio-temporal direction of $\tilde{k}$.

12. A non-transitory computer-readable medium storing computer-executable code, comprising code for causing a computer to cause a processor to: perform a method of any of clauses 1 to 11.

13. A system for simulating interactions with an infant, comprising: at least one processor that is configured to: perform a method of any of clauses 1 to 11.

14. The system of clause 13, further comprising: the image sensor comprising a plurality of detectors configured to detect arrival of individual photons, the plurality of detectors arranged in an array.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 5 can be executed or performed in any suitable order or sequence not limited to the order and sequence shown and described in the figures. Also, some of the above steps of the process of FIG. 5 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for facilitating single-photon computer vision tasks, comprising:
   an image sensor comprising a plurality of detectors configured to detect arrival of individual photons, the plurality of detectors arranged in an array;
   at least one processor that is programmed to:
      cause the image sensor to generate a sequence of images representing a scene, each of the images comprising a plurality of pixels;
      perform, for each of a plurality of three dimensional filters, a convolution between the three dimensional filter and a plurality of frames,
         wherein each of the plurality of frames is based on one or more of the images of the sequence of images;
      generate, for each of the plurality of frames, a plurality of filter bank responses each corresponding to a three dimensional filter of the plurality of three dimensional filters; and
      perform a computer vision process based on the plurality of filter responses.

2. The system of claim 1, wherein each of the plurality of detectors comprises a single photon avalanche diode (SPAD).

3. The system of claim 1, wherein each image of the sequence of images comprises a binary image that represents photons detected by the image sensor during an exposure time T.

4. The system of claim 1, wherein each of the plurality of three dimensional filters comprises a velocity tuned filter, and
   wherein a first subset of the plurality of three dimensional filters are tuned to a three dimensional frequency $k:=(k_x, k_y, k_t)$, where $k_x$ and $k_y$ represent spatial patterns, and $k_t$ represents a pattern in time, each of the three dimensional filters of the first subset having a different scale.

5. The system of claim 1, wherein the at least one processor that is further programmed to:
   determine a z-score for each of the plurality of filter bank responses;
   map each z-score to a weight associated with the respective filter bank for which the z-score was determined; and
   utilize the weighted filter bank responses to perform the computer vision process based on the plurality of filter responses.

6. The system of claim 5, wherein the at least one processor that is further programmed to:
   estimate a variance value $Var(R_k[p])$ using a relationship $V_k[p] := V(\hat{c}[p]) \Sigma_q |h_k[q]|^2$,
      where $R_k[p]$ is a filter bank response generated by applying a filter $h_k[q]$ to the plurality of frames $B[p]$, $V(\hat{c}[p])$ is a variance of an estimated local average flux over $B[p]$, and $\Sigma_q |h_k[q]|^2$ is a sum of the filter $h_k[q]$ over $q<p$; and
   determine the z-score using a relationship
   $$z_k[p] := \frac{|R_k[p]|}{\sqrt{V_k[p]}}.$$

7. The system of claim 6, wherein the at least one processor that is further programmed to:
   map each z-score to a weight associated with the respective filter bank for which the z-score was determined using a relationship $w(z):=1-\exp(-\max(0, z-z_0))$, where $z_0$ comprises a threshold z-score.

8. The system of claim 1, wherein the computer vision process is an edge detection process, and
   wherein at least one processor that is further programmed to:
      perform the computer vision process based on a phase congruency associated with each of the plurality of filter responses.

9. The system of claim 8, wherein at least one processor that is further programmed to:
   detect one or more corners based on the phase congruency associated with each of the plurality of filter responses.

10. The system of claim 1, wherein the computer vision process is a motion estimation process, and
    wherein at least one processor that is further programmed to:
       perform the computer vision process for each of the plurality of pixels based on a phase constancy relationship $v_x \cos\tilde{\theta} + v_y \sin\tilde{\theta} = \cot\tilde{\phi}$,
          where $(v_x, v_y)$ is a velocity at the respective pixel, $v_n = \cot\tilde{\phi}$ is a component velocity of a respective three dimensional filter $\tilde{k}$ in a spatial direction $\tilde{\theta}$, and $\tilde{k}:=\tilde{s}\cdot(\sin\tilde{\phi}\cos\tilde{\theta}, \sin\tilde{\phi}\sin\tilde{\theta}, \cos\tilde{\phi})$,
          where $(\tilde{\theta}, \tilde{\phi})$ is a spatio-temporal direction of $\tilde{k}$.

11. A method for facilitating single-photon computer vision tasks, the method comprising:
    causing an image sensor to generate a sequence of images representing a scene, each of the images comprising a plurality of pixels,
       wherein the image sensor comprises a plurality of detectors configured to detect arrival of individual photons, the plurality of detectors arranged in an array;
    performing, for each of a plurality of three dimensional filters, a convolution between the three dimensional filter and a plurality of frames,
       wherein each of the plurality of frames is based on one or more of the images of the sequence of images;
    generating, for each of the plurality of frames, a plurality of filter bank responses each corresponding to a three dimensional filter of the plurality of three dimensional filters; and
    performing a computer vision process based on the plurality of filter responses.

12. The method of claim 11, wherein each of the plurality of detectors comprises a single photon avalanche diode (SPAD).

13. The method of claim 11, wherein each image of the sequence of images comprises a binary image that represents photons detected by the image sensor during an exposure time T.

14. The method of claim 11, wherein each of the plurality of three dimensional filters comprises a velocity tuned filter, and
    wherein a first subset of the plurality of three dimensional filters are tuned to a three dimensional frequency $k:=(k_x, k_y, k_t)$, where $k_x$ and $k_y$ represent spatial patterns, and $k_t$ represents a pattern in time, each of the three dimensional filters of the first subset having a different scale.

15. The method of claim 11, further comprising:
determining a z-score for each of the plurality of filter bank responses; mapping each z-score to a weight associated with the respective filter bank for which the z-score was determined; and
utilize the weighted filter bank responses to perform the computer vision process based on the plurality of filter responses.

16. The method of claim 15, further comprising:
estimating a variance value $Var(R_k[p])$ using a relationship $V_k[p]:=V(\hat{c}[p])\Sigma_q |h_k[q]|^2$,
where $R_k[p]$ is a filter bank response generated by applying a filter $h_k[q]$ to the plurality of frames $B[p]$, $V(\hat{c}[p])$ is a variance of an estimated local average flux over $B[p]$, and $\Sigma_q |h_k[q]|^2$ is a sum of the filter $h_k[q]$ over $q<p$; and
determining the z-score using a relationship $$z_k[p] := \frac{|R_k[p]|}{\sqrt{V_k[p]}}.$$

17. The method of claim 11, wherein the computer vision process is an edge detection process based on a phase congruency associated with each of the plurality of filter responses.

18. The method of claim 11, wherein the computer vision process is a motion estimation process based on a phase constancy relationship.

19. A non-transitory computer readable medium containing computer executable instructions that, when executed by a processor, cause the processor to perform a method for facilitating single-photon computer vision tasks, the method comprising:
causing an image sensor to generate a sequence of images representing a scene, each of the images comprising a plurality of pixels,
wherein the image sensor comprises a plurality of detectors configured to detect arrival of individual photons, the plurality of detectors arranged in an array;
performing, for each of a plurality of three dimensional filters, a convolution between the three dimensional filter and a plurality of frames,
wherein each of the plurality of frames is based on one or more of the images of the sequence of images;
generating, for each of the plurality of frames, a plurality of filter bank responses each corresponding to a three dimensional filter of the plurality of three dimensional filters; and
performing a computer vision process based on the plurality of filter responses.

20. The non-transitory computer readable medium of claim 19, wherein each of the plurality of detectors comprises a single photon avalanche diode (SPAD).

21. The non-transitory computer readable medium of claim 19, wherein each image of the sequence of images comprises a binary image that represents photons detected by the image sensor during an exposure time T.

* * * * *